United States Patent [19]

Chang et al.

[11] Patent Number: 5,040,130

[45] Date of Patent: Aug. 13, 1991

[54] COMPUTER GRAPHICS BOUNDARY—DEFINED AREA CLIPPING AND EXTRANEOUS EDGE DELETION METHOD

[75] Inventors: Fu-Chung Chang, Rhinebeck; James A. Donnelly, West Hurley; Richard A. Marino, Kingston, all of N.Y.; Terence W. Lindgren, Littleton, Mass.

[73] Assignee: International Business Machines Corporation, Armonk, N.Y.

[21] Appl. No.: 520,161

[22] Filed: May 7, 1990

Related U.S. Application Data

[63] Continuation of Ser. No. 247,020, Sep. 20, 1988, abandoned.

[51] Int. Cl.$^5$ .................. G06F 15/62; G09G 1/14
[52] U.S. Cl. .................. 364/521; 364/522; 340/747; 340/723
[58] Field of Search .......... 364/521, 522, 518; 340/747, 729, 723

[56] References Cited

U.S. PATENT DOCUMENTS

| | | | |
|---|---|---|---|
| 3,602,702 | 8/1971 | Warnock | 364/522 |
| 3,639,736 | 2/1972 | Sutherland | 364/723 |
| 3,816,726 | 6/1974 | Sutherland et al. | 340/747 X |
| 3,889,107 | 6/1975 | Sutherland | 340/747 X |
| 4,396,989 | 8/1983 | Fleming et al. | 364/521 |
| 4,412,296 | 10/1983 | Taylor | 364/521 |
| 4,481,594 | 11/1984 | Staggs et al. | 364/521 |
| 4,608,653 | 8/1986 | Setoguchi | 364/522 |
| 4,622,545 | 11/1986 | Atkinson | 340/747 |
| 4,626,838 | 12/1986 | Tsujioka et al. | 340/744 |
| 4,646,075 | 2/1987 | Andrews et al. | 340/747 |
| 4,656,468 | 4/1987 | Takikawa et al. | 340/744 |
| 4,698,779 | 10/1987 | Holden et al. | 364/520 |
| 4,791,582 | 12/1988 | Ueda et al. | 364/522 |
| 4,943,801 | 7/1990 | Oguchi | 340/723 |

OTHER PUBLICATIONS

J. D. Foley et al., "Fundamentals of Interactive Computer Graphics", pp. 144-151, 450-456 (1982).
K. Weiler, Carnegie-Mellon University, "Polygon Comparison Using a Graph Representation", pp. 10-18 (1980).
J. Clark, Stanford University, "A VLSI Geometry Processor for Graphics", (1980).
B. D. Ackland and N. H. Weste, "The Edge Flag Algorithm—A Fill Method for Raster Scan Displays", (1981).
A. C. Gay, IBM (U.K.) Laboratories Ltd., "Experience in Practical Implementation of Boundary-Defined Area Fill", (1985).

Primary Examiner—Gary V. Harkcom
Assistant Examiner—Raymond J. Bayerl
Attorney, Agent, or Firm—William A. Kinnaman, Jr.; Mark S. Walker

[57] ABSTRACT

A method for clipping a line segment boundary-defined area against a limiting plane is disclosed for use in a computer graphics display system wherein graphics figures are represented by random sets of polylines definitive of line segment boundary-defined areas. Pursuant to the clipping method, once two intersection points are generated against one plane, the points are connected to form an edge of the new clipped boundary-defined area. The order of intersection point connection is irrelevant to the invention and the method can accomodate discontinuously presented data as readily as continuously presented data. Implementing the method essentially requires only one register to store the first intersection point and a flag register to indicate the status of the present clip point, i.e., whether the clipped point is the first or second of two points to be paired. In another aspect of the invention, an improved extraneous edge deletion method is provided capable of deleting extraneous lines formed as a result of a line segment boundary-defined area being clipped against a limiting plane. Pursuant to the method, clipped X-axis and Y-axis extraneous edges are eliminated during area fill processing in the graphics display system.

19 Claims, 13 Drawing Sheets

| FCP | BP/SRM | VECTOR |
|---|---|---|
| x x x x | o o o o | P1P2' |
| x<br>o<br>o<br>o x x x | x<br>x<br>x<br>o o o o | P2'P3' |
| x x x x<br>o       o<br>o<br>o x x x | o o o o<br>x<br>x<br>o o o o | P3'P4 |
|      x<br>     o<br>     o<br>x x x o<br>o<br>o<br>o x x x |      o<br>     o<br>     o<br>o o o o<br>x<br>x<br>o o o o | P4P5 |
| x x x x<br>     o<br>     o<br>x x x o<br>o<br>o<br>o x x x | o o o o<br>     o<br>     o<br>o o o o<br>x<br>x<br>o o o o | P5P6' |
| x x x x<br>o       o<br>o       o<br>o x x o<br>x<br>x<br>x x x x<br>o<br>o<br>o | o o o o<br>x       o<br>x       o<br>o o o o<br>x<br>x<br>o o o o<br>x<br>x<br>x | P6'P7' |
| x x x x<br>o       o<br>o       o<br>o x x o<br>x<br>x<br>x x x x<br>o<br>o<br>o x x x | o o o o<br>x       o<br>x       o<br>o o o o<br>x<br>x<br>o o o o<br>x<br>x<br>o o o o | P7'P8 |
| x x x x<br>o       o<br>o       o<br>o x x o<br>x<br>x<br>x x x x<br>o       o<br>o       o<br>o x x o | o o o o<br>x       o<br>x       o<br>o o o o<br>x<br>x<br>o o o o<br>x       o<br>x       o<br>o o o o | P8P1 |

FIG. 7B

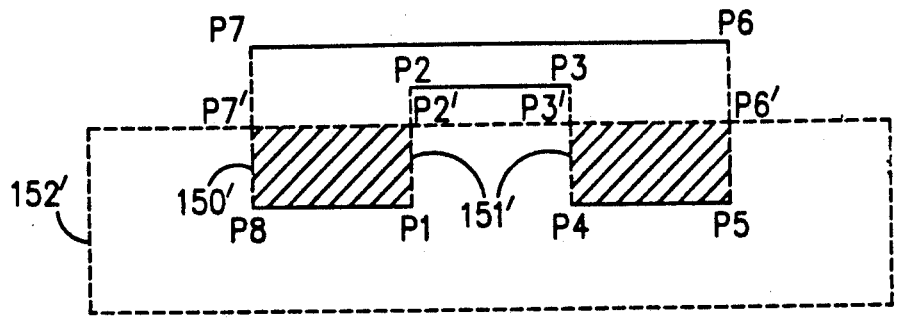

FIG.8A

| FCP | BP/SRM | VECTOR |
|---|---|---|
| x<br>o<br>o<br>o | o<br>o<br>o<br>o | P1P2' |
| o x x o<br>o<br>o<br>o | o x x x<br>o<br>o<br>o | P2'P3' |
| o x x o<br>o       o<br>o       o<br>o       o | o x x o<br>o       o<br>o       o<br>o       o | P3'P4 |
| o x x o<br>o       o<br>o       o<br>o       o x x x | o x x o<br>o       o<br>o       o<br>o       o o o o | P4P5 |
| o x x o       x<br>o       o       o<br>o       o       o<br>o       o x x o | o x x o       o<br>o       o       o<br>o       o       o<br>o       o o o o | P5P6' |
| o x x o x x o x x o<br>o       o       o<br>o       o       o<br>o       o x x o | x x x o x x o x x o<br>o       o       o<br>o       o       o<br>o       o o o o | P6'P7' |
| o x x o x x o x x o<br>o       o       o       o<br>o       o       o       o<br>o       o       o x x o | o x x o x x o x x o<br>o       o       o       o<br>o       o       o       o<br>o       o       o x x o | P7'P8 |
| o x x o x x o x x o<br>o       o       o       o<br>o       o       o       o<br>o x x o       o x x o | o x x o x x o x x o<br>o       o       o       o<br>o       o       o       o<br>o o o o       o o o o | P8P1 |

FIG.8B

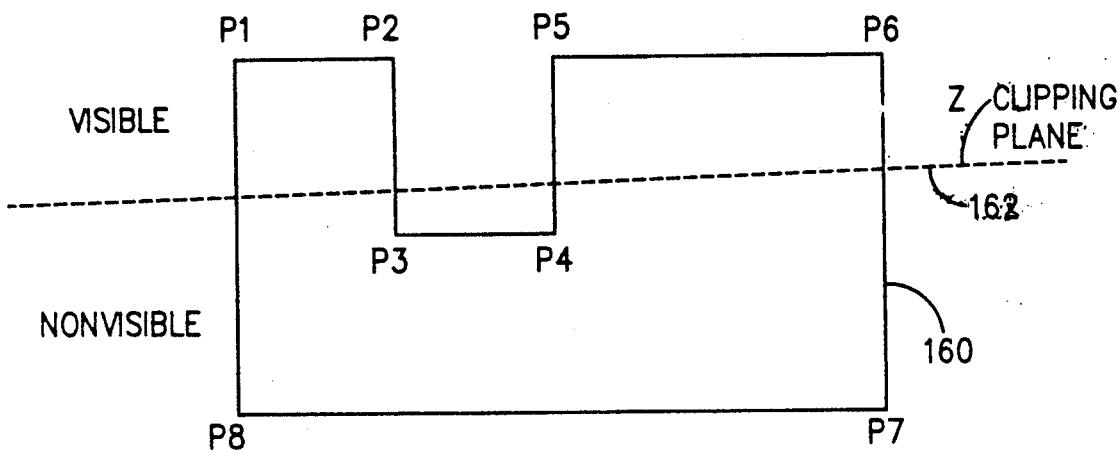

FIG.10A

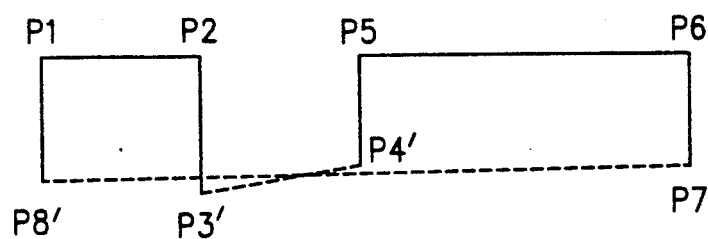

FIG.10B $$\begin{pmatrix} 0-P_8'P_7' & \circ\circ\circ\circ\circ\circ\circ\circ\circ\circ\circ\circ\circ\circ\circ \ \ \ \ \ \ \ \ \ \ \ \ \ \ \ \ \ \ \ \ x\ x\ x\ \blacksquare\ \circ\circ\circ\circ\circ\circ\circ\circ\circ\circ\circ\circ\circ\circ\circ \\ X-P_3'P_4' & \circ\circ\circ\circ\circ\circ\circ\circ\ \alpha\blacksquare\blacksquare\ \circ\circ\circ \\ \\ XOR & \circ\circ\circ\circ\circ\circ\circ\circ\ \ \ \ \ \ \ \ \ \ \ \ \ \ \ \ \ \ x\ x\ x\ \ \ \ \circ\circ\circ\circ\circ\circ\circ\circ\circ\circ\circ\circ\circ\circ\circ \\ & \circ\circ\circ \end{pmatrix}$$

FIG.10C

COMPUTER GRAPHICS BOUNDARY—DEFINED AREA CLIPPPING AND EXTRANEOUS EDGE DELETION METHOD

This application is a continuation of application Ser. No. 247,020, filed Sept. 20, 1988, now abandoned.

BACKGROUND OF THE INVENTION

1. Technical Field

This invention relates in general to computer graphics display systems, and more particularly, to a method for clipping a line segment boundary-defined area against a limiting plane and to a related clipped extraneous edge deletion method, both for use in such systems wherein graphics figures are represented by polylines of data corresponding to line segment boundary-defined areas.

2. Definitions

The following terms and phrases are used herein in accordance with the following meanings:

1. Line Segment Boundary-Defined Area: any geometric configuration having a closed boundary defined by means of vertices and connecting straight line segments, e.g., convex, concave and self-intersecting polygons.

2. Polyline: a set of at least two vertices and connecting line segment(s) (i.e., a set comprising at least one vector); a line segment boundary-defined area is defined by at least one polyline.

3. Continuous/Discontinuous: continuous means read or generated in consecutive order, whether clockwise or counterclockwise; discontinuous means read or generated in a nonsequential manner, and includes line segments read or generated in inconsistent directions, i.e., clockwise and counterclockwise.

3. Description of Prior Art

Typically, figures or objects to be displayed in a computer graphics system are defined using such primitives as lines, characters and/or line segment boundary-defined areas, such as polygons. Of the geometric operations performed by such systems, clipping is among the most important. Clipping allows the graphics system to only display those portions of a primitive which lie within an operator defined viewing window or region. Thus, boundary-defined area or polygon clipping is a process whereby a closed surface extending beyond the border of some viewing window, whether two-dimensional or three-dimensional, is reduced to a surface which does not extend beyond said border. Essentially, the process involves clipping off those parts of the closed surface which lie outside the area defining the field of view, to thereby eliminate off screen or invisible portions of figures from the actual developed image.

Perhaps the most commonly referenced closed surface clipping process is the Sutherland-Hodgman algorithm. Sutherland and Hodgman's clipping algorithm uses a divide-and-conquer strategy by solving a series of simple and identical problems which, when combined, solve the overall problem. The process is described in U.S. Pat. No. 3,816,726, entitled "Computer Graphics Clipping System for Polygons." Textual treatment of the Sutherland-Hodgman algorithm is provided by J. D. Foley and A. Van Dam, in *Fundamentals of Interactive Computer Graphics* at pp. 451–455 (1982), which is incorporated herein by reference.

Briefly described, the Sutherland and Hodgman algorithm accepts as input a series of vertices representative of a polygon, clips the polygon against a viewing boundary and outputs another series of vertices defining the clipped polygon. The algorithm continuously "marches" around a polygon from an arbitrary starting-/ending vertex, at each step examining the relationship between successive vertices and the viewing boundary, or more particularly, one plane of the viewing boundary.

The critical requirement of the Sutherland-Hodgman algorithm is that polygon vertices be submitted to the algorithm in a continuous manner until all vertices of the polygon are considered. The continuous manner requirement can be a serious restriction to a graphics system user in a large number of applications. Frequently, in industrial and mechanical design applications, e.g., where a physical part of some kind is being designed, the order in which the user specifies the boundaries of a defined area is random. This occurs most often when a part is being designed which is symmetrical about an axis, or axes, such that the user need only define a half or quarter of the image ultimately to be displayed with the balance being computer generated.

In view of this, and the fact that the Sutherland-Hodgman algorithm requires the continuous input of vertices data, three options exist, namely; (1) through the applications program, the user can be restricted to defining only continuous line segment boundary-defined areas; (2) intermediate processing can be inserted either at the host computer or the graphics system to rearrange discontinuously presented data into consecutive data; or (3) a different closed surface clipping algorithm capable of handling discontinuously presented data can be used. The first listed option obviously results in a user restricted system, while the first and second listed options would both adversely affect system performance. This leaves the third option to be pursued. Although believed preferable, alternate clipping algorithms capable of handling discontinuously presented data definitive of line segment boundary-defined areas typically require a relatively large amount of memory to store clipped points for subsequent sorting and generation of line segments therebetween. For example, the IBM 5080 is such a graphics system, requiring 1k of memory for implementation of its clipping algorithm. Thus, a nonrestrictive closed surface clipping method operable on continuously or discontinuously presented data and requiring less hardware and/or software to implement than presently available clipping methods capable of operating on such data, is believed clearly beneficial.

Another disadvantage of most line segment boundary-defined area clipping algorithms concerns the deletion of extraneously produced lines falsely representative of clipped boundaries, e.g., such lines are produced where the clipping process results in two disjoint polygons. The problem is believed to occur in most, if not all, known clipping algorithms, including the Sutherland-Hodgman method, and has been addressed by either removing the extraneous edges with more processing steps subsequent the clipping algorithm or by using a more complex clipping algorithm, such as the Weiler-Atherton algorithm discussed at p. 455 of the referenced Foley and Van Dam text, to initially avoid generating the clipped extraneous edges. Obviously, both of these approaches have an adverse effect on performance. Thus, a novel clipped extraneous edge deletion method as described below, which is more efficient in operation, and which cooperates with a line segment boundary-defined area clipping method to more efficiently produce a clipped closed surface is believed clearly desirable.

SUMMARY OF THE INVENTION

As more fully described below, this invention comprises in principal aspect a method for clipping a line segment boundary-defined area against a limiting plane for use in a computer graphics display system wherein figures are represented by ordered or random sets of polylines definitive of line segment boundary-defined areas. The method includes the steps of: determining the point at which a first line segment intersects the clipping plane; determining the point at which a second line segment intersects the clipping plane; pairing the first and second intersection points; repeating the above steps until all edges of the boundary-defined area are processed; and when a plurality of intersection point pairs are determined, processing said point pairs to eliminate any extraneous edge formed when lines are drawn between the points comprising each of said intersection point pairs, wherein said point pair processing occurs during the area fill processing of the graphics display system when said plane comprises an X-axis or Y-axis plane.

In another aspect, the invention comprises a method for deleting any extraneous lines formed as a result of a line segment boundary-defined area being clipped against an X-axis or Y-axis limiting plane. The extraneous line deletion method comprises defining each line of the clipped boundary-defined area, and simultaneously removing any clipped extraneous X-axis edge or clipped extraneous Y-axis edge.

Accordingly, a principal object of the present invention is to provide a boundary-defined area clipping method capable of accepting either continuously or discontinuously presented polylines.

Another object of the present invention is to provide a boundary-defined area clipping method which requires less hardware and/or software to implement and provides improved system performance over heretofore known clipping algorithms.

Yet another object of the present invention is to provide an extraneous edge deletion method for use in combination with a boundary-defined area clipping algorithm to erase lines falsely representative of a clipped boundary in a more efficient manner than heretofore known deletion techniques.

BRIEF DESCRIPTION OF THE DRAWINGS

These and other objects, advantages and features of the present invention will be more readily understood from the following detailed description, when considered in conjunction with the accompanying drawings in which:

FIGS. 7A and 7B graphically illustrate X-axis clipped extraneous edge deletion pursuant to the present invention;

FIGS. 8A and 8B graphically illustrate Ymax clipped extraneous edge deletion pursuant to the present invention;

FIGS. 10A, 10B and 10C graphically illustrate a unique feature of extraneous lines created as a result of clipping a line segment boundary-defined area against a Z-axis plane;

DETAILED DESCRIPTION OF THE INVENTION

As briefly noted above, and more fully explained below, this invention comprises in one aspect a line segment boundary-defined area clipping method for computer graphics display systems wherein figures or objects are represented by closed surface primitives. The method accepts random, or ordered, sets of polylines definitive of line segment boundary-defined areas and outputs sets of clipped polylines representative of clipped boundary-defined areas.

Figure 1:
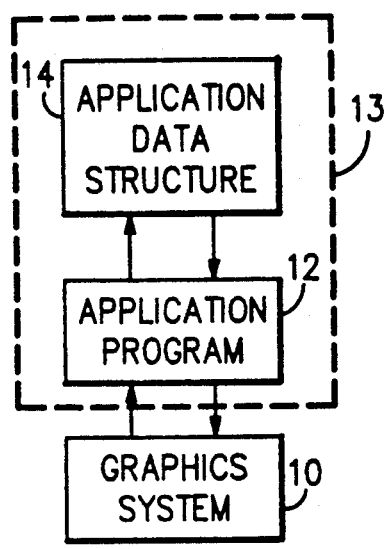
FIG. 1 is a general block diagram useful in describing the interaction between a host computer and a graphics system incorporating the present invention.

Referring first to FIG. 1, a block diagram representation of the interaction between a graphics system 10 and a host computer 13 will be described. Host computer 13 includes an application program 12 and application data structure 14. Application program 12 stores into and retrieves data from application data structure 14 and sends graphics commands to graphics system 10. Data structure 14 holds descriptions of real or abstract figures or objects which are to appear on the graphics monitor, discussed below. An object description stored within data structure 14 contains geometric coordinate data that define the shape of components of the object, object attributes, and connectivity relationships and positioning data that define how the components fit together. For example, as noted above, objects are commonly defined by closed surface geometric primitives such as polygons. A polygon is typically represented by a set of vertices and connecting line segments defining polylines.

Figure 2:
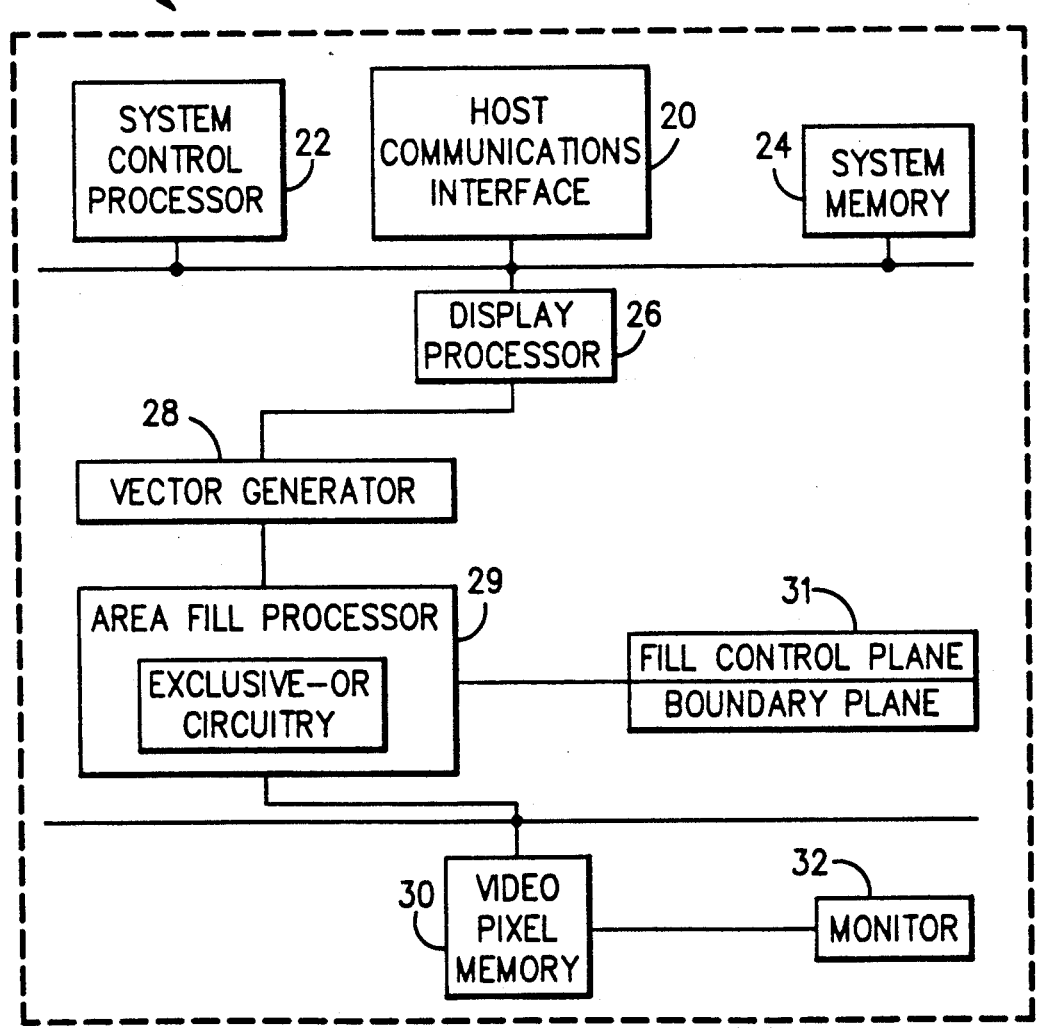
FIG. 2 is a detailed lock diagram representation of the graphics system of FIG. 1.

Graphics system 10 is shown in greater detail in FIG. 2. System 10 includes a host communications interface 20, system control processor 22, system memory 24, display processor 26, vector generator 28, area fill processor 29, fill control plane/boundary plane 31, video pixel memory 30, and monitor 32 for viewing graphics figures or objects. Each of these components can be implemented by elements of commercially available computer graphics display systems such as the IBM 5080. The host communication interface 20 provides the serial interface of graphics system 10 to the host computer 13 (FIG. 1). System control processor 22 is a general purpose processor that has master control of graphics system 10. Processor 22 is responsible for servicing all attached graphics input/output devices, coordinating the associated processing with display processor 26, and interfacing with the host computer 13 via interface 20. Display processor 26 is responsible for executing graphics orders in the display storage program residing in system memory 24 and is concerned primarily with the generation of the image that will appear on display monitor 32. Display processor 26 performs the following functions: decoding graphics orders and executing non-drawing orders, e.g., bookkeeping and control; performing transformation and clipping functions to geometric primitives, such as line segment boundary-defined areas; and preparing geometric objects such as lines, characters, markers, filled polygons for display by preprocessing and feeding the data to vector generator 28, area fill processor 29 and video pixel memory 30. Vector generator 28 and area fill processor 29 are responsible for drawing figures by accepting end points of line segments as input and generating pixels in the video pixel memory as output for display. Video pixel memory 30 consists of eight 1k by 1k bit planes which support 256 colors simultaneously via color look-up tables. The image stored in video pixel memory 30 is displayed in monitor 32 for operator viewing.

Figure 3A:
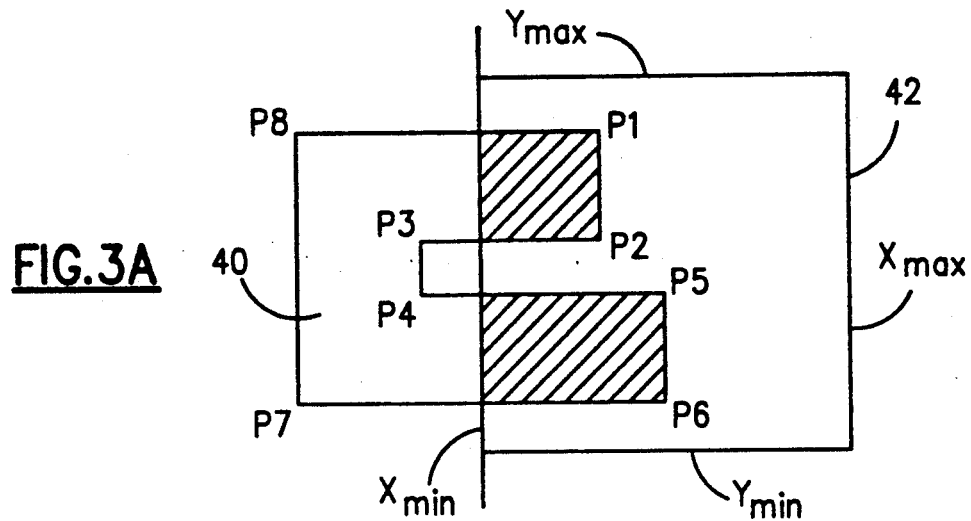
FIGS. 3A, 3B and 3C graphically illustrate the clipping of a closed surface primitive against a viewport.

Pursuing a specific line segment boundary-defined area clipping example, shown in FIG. 3A is a closed surface 40 of irregular shape, a portion of which is depicted to reside within a window or viewport 42. Surface 40 includes eight vertices, P1, P2, P3, P4, P5, P6, P7 and P8. Window 42 is user defined, and represents that area in a two-dimensional illustration inside of which a graphics figure is visible, i.e., is to be displayed, and outside of which it is invisible, i.e., is to be clipped. Window 42 is defined by four clipping planes Xmin, Xmax, Ymin and Ymax.

The clipping method described herein operates to clip a boundary-defined area, e.g., surface 40, against a window essentially by treating each vertex of the area defining polyline(s) one at a time and considering one plane of the window at a time. Except for the first vertex of a polyline, each vertex is considered to be an end point of an edge defined by a present input vertex value, herein termed P2, and a just previous input vertex value, herein termed P1. The clipping method produces output vertices which define the clipped boundary-defined area based upon the relationship between the present vertex P2 and the previous vertex P1 as these points relate to the limiting plane under consideration.

Figure 4A:
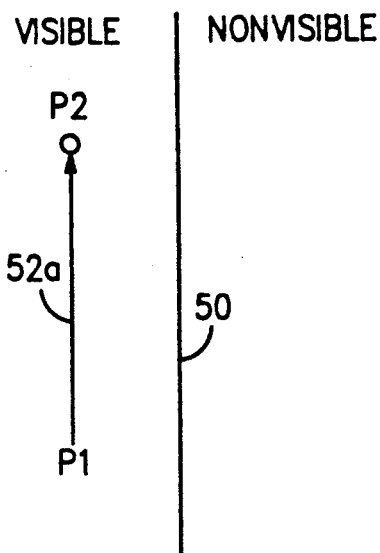
FIGS. 4A, 4B, 4C and 4D graphically illustrate the four basic clipping operations performed by clipping algorithms.
Figure 4B:
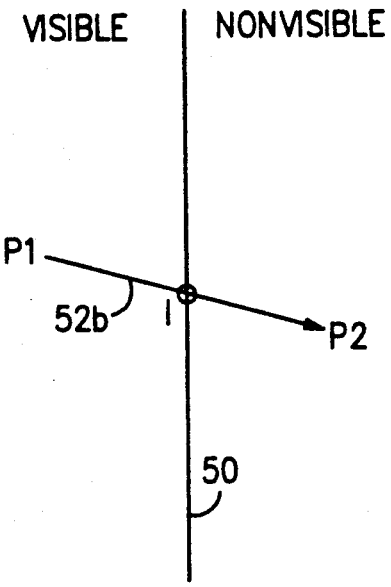
Figure 4C:
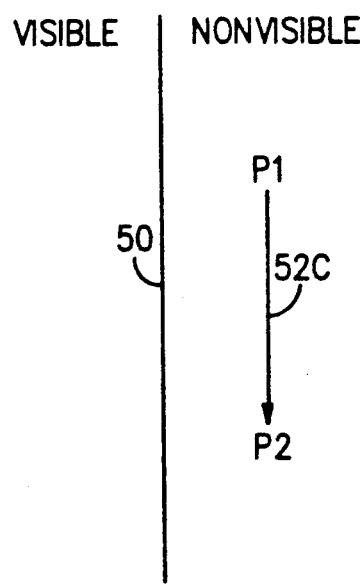
Figure 4D:
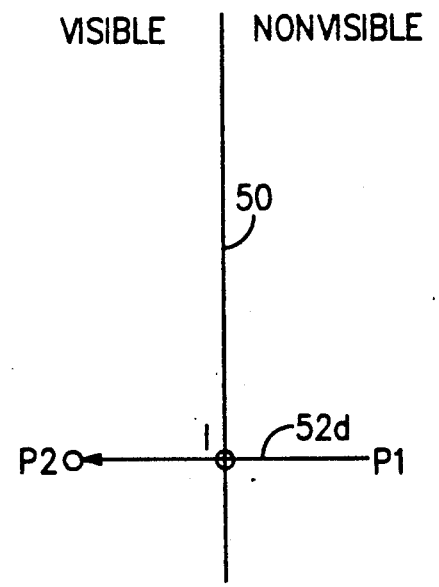

Before discussing operation of the invention in detail, traditional clipping operations will be briefly reviewed with reference to the illustrations of FIGS. 4A-4D. As shown, there are four possible relationships between a closed surface edge and a clipping plane. The edge may be entirely on the visible side of the limiting plane (FIG. 4A), leave the visible side of the limiting plane (FIG. 4B), be entirely on the nonvisible side of the limiting plane (FIG. 4C), or enter the visible side of the limiting plane (FIG. 4D).

FIGS. 4A, 4B, 4C and 4D each depict a limiting plane 50, which comprises one boundary of a two-dimensional or three-dimensional viewing window. Portions of a boundary-defined area existing on the visible, left-hand side of plane 50 are to be preserved for display while portions thereof lying on the nonvisible, right-hand side are to be clipped. In each of the four cases illustrated, a boundary-defined area edge 52a, 52b, 52c, and 52d, respectively, is defined by a present vertex P2 and a just previous vertex P1. It is assumed for this discussion that vertices are continuously presented for clipping.

Referring first to FIG. 4A, edge 52a defined by vertices P1 and P2 lies entirely on the visible side of plane 50 and, accordingly, no clipping operation is to be performed thereon. Vertices P1 and P2 in this case continue to exist and define an edge of the clipped polygon to eventually be presented. Vertex P2 becomes the new vertex P1 for the next line segment evaluation (FIG. 4B) and is also provided as output.

The illustration of FIG. 4B shows an edge 52b defined by vertices P1 and P2 which extends from within the field of vision to without. The portion of the line segment to the left of plane 50 is to be preserved while the portion to the right is to be clipped. Consequently, the intersection point I of line segment 52b with plane 50 is outputted as a vertex of the clipped polygon to be presented. As before, vertex P2 becomes the just previous vertex P1 for the next evaluation (FIG. 4C).

The situation depicted in FIG. 4C involves an edge 52c which lies entirely outside the field of vision, i.e., to the right of plane 50. Consequently, since vertex P1 was dismissed in the prior test (FIG. 4B) and vertex P2 is now dropped, neither is preserved for display. As before, vertex P2 becomes the previous vertex P1 for the next evaluation. (FIG. 4D)

Lastly, depicted in FIG. 4D is an edge 52d entering the visible side of plane 50 from without the field of vision. As a consequence, two outputs are provided in the form of the intersection point I and the present vertex P2; that is, to define the clipped edge between intersection point I and vertex P2, both points must be provided as output.

Figure 3B:
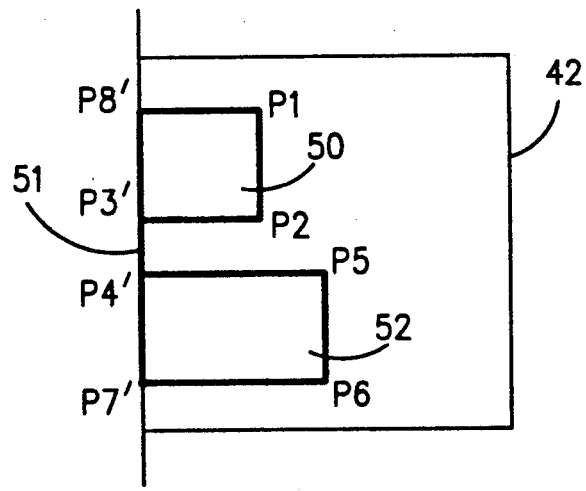

Thus, it will be understood that by continuously treating the vertices of a closed surface such as that illustrated in FIG. 3A with respect to each of the clipping planes, a new surface as shown in FIG. 3B having vertices P1, P2, P3', P4', P5, P6, P7' and P8' can be developed that is definitive of a fragment of the original boundary-defined area to be exhibited or displayed.

As noted above, a basic feature of the clipping method described herein is its operability on a line segment boundary-defined area, such as surface 40, notwithstanding the inputting of polylines definitive of the area's vertices and connecting line segments in a discontinuous or random manner. For example, a user may have defined closed surface 40 as two discontinuous polylines: P1P2P3P4P5P6 and P1P8P7P6.

The basic principle underlying the clipping method is the recognition that whenever an edge defining line segment of a boundary-defined area intersects a limiting plane from the visible to invisible or vice-versa side of the plane, there must be another line segment coming from the opposite direction, since by its very definition a boundary-defined area is a closed geometric configuration. Pursuant to the method, once two intersection or clip points are generated against one plane, these points are connected to form an edge of the new, clipped boundary-defined area. The order of intersection point connection is irrelevant in this invention and thus the method can accommodate discontinuously presented data as readily as continuously presented data. If portions of lines connecting intersection points overlie, the lines are processed to remove the extraneous edges, or preferably as described below, extraneous edges existing in an X-axis or Y-axis clipping plane can be simultaneously removed with the drawing of clipped edges pursuant to the other aspect of this invention. Implementing the clipping method essentially requires only one register to store the first intersection or clip point and a flag register to indicate the status of the present clip point, i.e., whether it is the first or second of two points to be paired.

Figure 5:
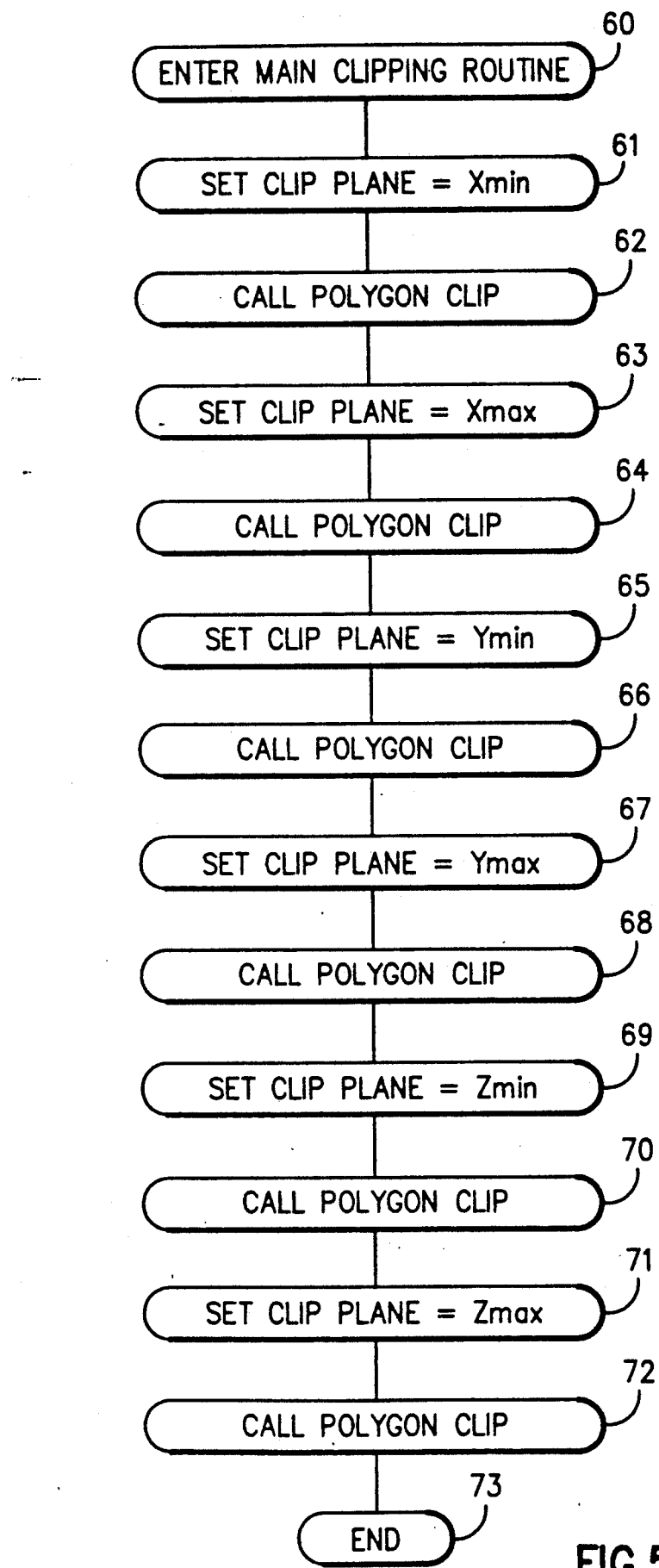
FIG. 5 is a main routine flowchart for three-dimensional pipeline clipping pursuant to the present invention.
Figure 6A:
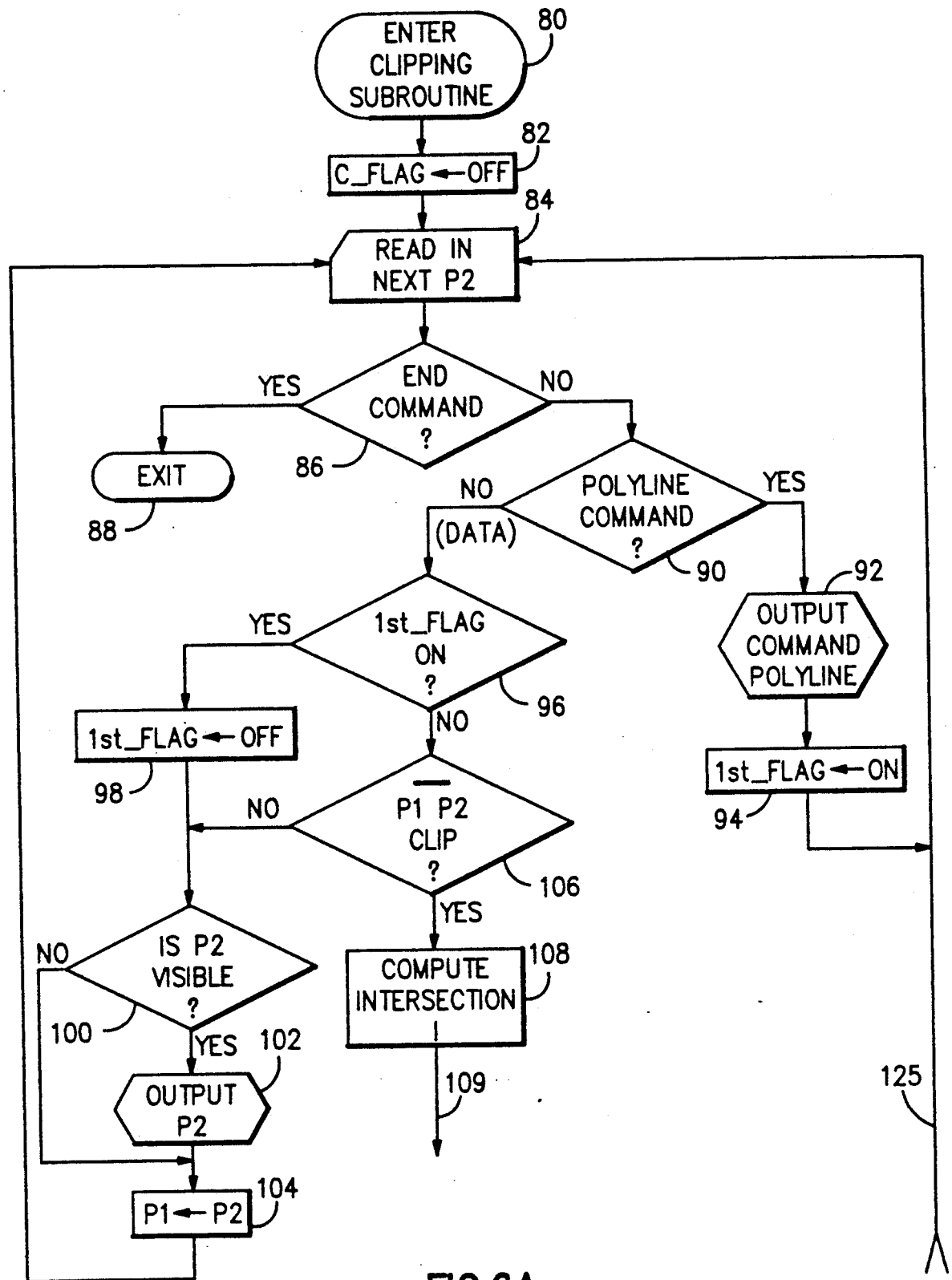
FIGS. 6A and 6B are a flow diagram representative of the clipping process of the present invention.
Figure 6B:
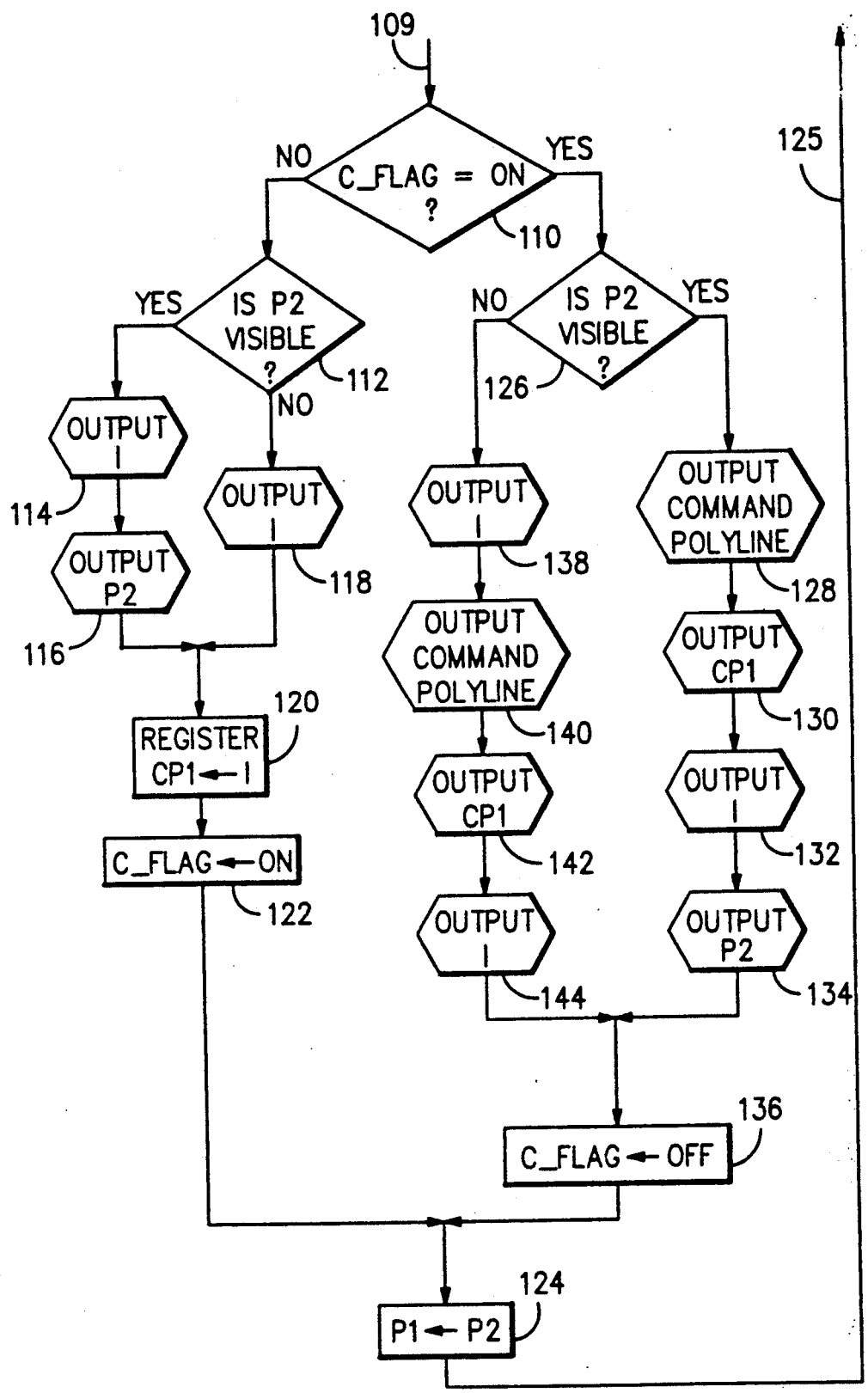

Clipping of line segment boundary-defined areas will now be considered in greater detail with reference to FIGS. 5, 6A and 6B, which illustrate one method, and its accompanying steps, to process data according to the present invention. Two-dimensional clipping requires four passes of data through the basic clipping algorithm of FIGS. 6A and 6B, e.g., the first and second passes are against the left and right X-axis clipping planes (i.e., Xmin and Xmax of FIG. 3A) and the third and fourth passes are against the lower and upper Y-axis clipping planes (Ymin and Ymax of FIG. 3A). Three-dimensional clipping correspondingly requires six passes of data through the algorithm. For example, referring to FIG. 5, after entering main clipping routine at 60, the display processor 26 (FIG. 2) is directed to set or define the plane against which the boundary-defined area is to be clipped equal to plane Xmin 61 of the viewing window and thereafter to call polygon clip subroutine 62 of FIGS. 6A and 6B. After processing the boundary-defined area against plane Xmin the processor returns to the main clipping routine to set the clip plane equal to Xmax 63 and hence to evaluate 64 the boundary-defined area against Xmax. The procedure continues until all planes of the viewport have been considered, i.e., Ymin 65 and 66, Ymax 67 and 68, Zmin 69 and 70, and Zmax 71 and 72, and an end clipping command 73 is encountered. The order in which the planes are defined for processing in the main clipping routine is arbitrary. Further, arbitrarily defined planes can be used in place of orthogonal X, Y, and Z axes.

Referring to FIG. 6A, graphics processor 26 enters the clipping routine at 80 and initially clears or sets to "off" a clipped status flag to indicate that no unpaired clipped intersection points presently exist "C—Flag←Off" 82. After executing instruction 82, the processor enters the main loop of the subroutine where it is directed to obtain the next piece of data inputted for evaluation and store same in the current point register P2 "Read in Next P2" 84. At this point, the data stored in register P2 will be representative of either one of two graphics orders or commands or a vertex of a polyline under evaluation. The two graphics commands possible are "End Boundary Definition Command" and "Begin Polyline Command". End Boundary Definition Command is an order indicating the termination of input data representative of a boundary-defined area, while Begin Polyline Command is an order signalling the beginning of a new polyline representative in whole or in part of a boundary-defined area. In addition to providing direction for the clipping algorithm, these graphics commands direct vector generator 28 in drawing the clipped boundary-defined area, e.g., a Begin Polyline Command instructs the generator to stop drawing at a particular point and move to a new, typically discontinuous vertex before continuing with the drawing operation. The End Boundary Definition Command directs the generator to discontinue the boundary definition phase and begin the fill phase of the pixel generation stage, as described further below.

Flow from instruction 84 is to inquiry 86 "End Command?", which directs the processor to determine whether the data stored in current point register P2 comprises an End Boundary Definition Command. If "yes", flow returns to the main clipping routine, e.g., FIG. 5, via exit 88. If "no", flow proceeds to inquiry 90 "Polyline Command?", to determine whether data stored in current point register P2 comprises a "Begin Polyline Command". If "yes", a Begin Polyline Command is written to the display processor output, "Output Command Polyline" 92, and a flag is set to indicate that the next piece of data will be the first vertex of the polyline, "1st—Flag←On" 94. The processor then returns to the beginning of the algorithm loop, i.e., instruction 84, to receive the next piece of data.

Returning to inquiry 90, if the answer is "no", meaning that the data in current point register P2 is a vertex of one line segment defining an edge of the closed surface under evaluation, flow is to inquiry 96 "1st—Flag On?". If data stored in register P2 is representative of the first vertex of a polyline, meaning 1st—Flag is "on", the processor is directed to clear the 1st—Flag, i.e., set the flag to the "off" state, "1st—Flag←Off" 98, and proceed to inquiry 100 "Is P2 Visible?". If the current vertex in register P2 is on the visible side of the clipping plane, current point P2 is written to the output, "Output P2" 102. Present point P2 is on the visible side of the plane if a simple inequality is satisfied, namely, Xmin≦P2(x), P2(x)≦Xmax, Ymin≦P2(y), or P2(y)≦Ymax, depending upon which plane is presently the defined clipping plane and assuming two-dimensional clipping. Current point P2 is then copied to the previous point register P1, "P1←P2" 104, and return is made to the top of the algorithm loop, i.e., instruction 84, to receive the next piece of data.

Returning to query 96, if 1—st Flag is "off", meaning the data in current point register P2 is not the first vertex after a Begin Polyline Command, flow is to inquiry 106 "P1P2 clip?", to determine whether the line segment defined by previous point P1 and current point P2 intersects the defined clipping plane. If line segment P1P2 is not clipped, flow is to inquiry 100 "Is P2 Visible?", to determine whether current point P2 is on the visible side of the clipping plane and hence to be written to the output at instruction 102, "Output P2". Again, current point P2 is copied to the previous point register P1, P1←P2" 104, and return is made to the top of the algorithm loop to get the next piece of data.

If line segment $\overline{P1P2}$ being evaluated at inquiry 106 does intersect the defined clipping plane, the processor is directed to compute the intersection point I "Compute Intersection I" 108. Intersection of the clipping plane can be determined by any known method, e.g, a particularly efficient method is described at pp. 146–147 of the initially referenced Foley and Van Dam text. Computation of intersection point I is accomplished via any standard line clipping algorithm, e.g., in the initially referenced text by Foley and Van Dam at pp. 145–151, which are incorporated herein by reference, several such line clipping algorithms are discussed.

As shown in FIG. 6B via connecting line 109, after determining intersection point I, the processor evaluates the state of a clipped status flag "C—Flag=On?" 110. If intersection point I is the first of two points to be paired, flow is to inquiry 112 "Is P2 Visible?", to determine whether present point P2 is on the visible side of the defined clipping plane. If "yes", intersection point I is written to the output, "Output I" 114, along with present point P2, "Output P2", 116 since line segment P1P2 enters the visible side of the plane from without the field of vision. If present point P2 is on the invisible side of the clipping plane, only intersection point I is written to the output, "output I" 118. Whether present point P2 is on the visible or nonvisible side of the clipping plane, intersection point I is stored in a register CP1 for later use, "CP1←I" 122, and the clipped status flag is set "on", to indicate an intersection point is now being held for pairing, "C_Flag←On" 122. After setting the clip status flag, the present point P2 is copied to the previous point register P1, "P1←P2" 124, and return is made via line 125 to the top of the algorithm loop to obtain the next piece of data.

Returning to inquiry 110, if the clipped status flag is "on", an intersection point is already stored in the CP1 register for pairing with the present intersection point I. Flow is thus initially to inquiry 126 "Is P2 visible?", to determine whether present point P2 is on the visible or nonvisible side of the clipping plane. If visible, a Begin Polyline Command is written to the output, "Output Command Polyline" 128, followed by the previous clip point stored in register CP1, "Output CP1" 130, the present intersection point I, "Output I" 132, and the present point P2, "Output P2" 134. Subsequent outputting polyline CP1, I, P2, the processor is directed to set the clipped status flag to the "off" state, "C_Flag←Off" 136.

If at inquiry 126 it is determined that end point P2 of the line segment P1P2 under evaluation is on the invisible side of the clipping plane, present intersection point I is first written to the output, "Output I" 138, followed by a Begin Polyline Command, "Output Command Polyline" 140, the stored clipped point, "Output CP1" 142, and the present intersection point, "Output I" 144. Again, after outputting paired intersection points, the clipped status flag is set to the "off" state, "C_Flag←Off" 136. Subsequent instruction 136, present point P2 is copied to the previous point register P1, "P1←P2" 124, and return is made via line 125 to the top of the algorithm loop, instruction 84, to obtain the next piece of data.

The feature of generating and outputting a Begin Polyline Command at instructions 128 and 140 to pair the previous intersection point stored in register CP1 with the present intersection point I for output is central to the described clipping algorithm's ability to process boundary edges in any order.

Figure 3C:
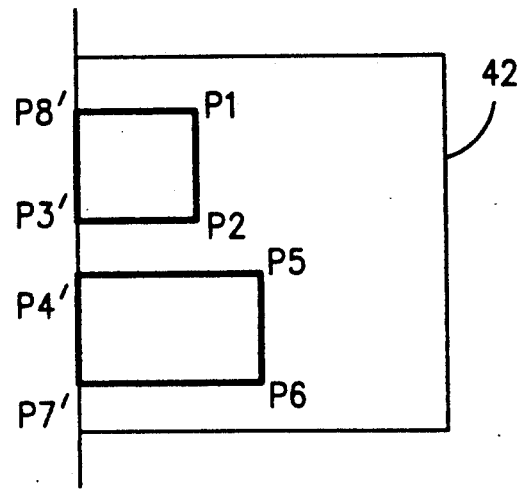

As noted initially, another aspect of the invention concerns the provision of an improved clipped extraneous edge deletion method. Referring to FIG. 3B, clipping of closed surface 40 against limiting plane Xmin results in two disjoint polygons 50 and 52 being formed on the visible side of the clipping plane along with an extraneous edge 51. Edge 51 is produced whether vertices are submitted continuously as P1P2P3P4P5P6P7P8P1 or discontinuously, e.g., as polylines P1P2P3P4P5P6 and P1P8P7P6. The desired result with extraneous edge 51 erased, is illustrated in FIG. 3C.

Pursuant to the invention, X-axis, Y-axis, and Z-axis clipped extraneous edges are each processed for removal differently. In particular, X-axis and Y-axis extraneous edges are beneficially removed during the boundary definition stage of system area fill, while Z-axis extraneous edges are eliminated by processing inserted between the system's clipping and area fill stages. X-axis and Y-axis extraneous edge deletion are discussed first below.

In the optimal implementation, the clipped polylines outputted by the algorithm of FIGS. 6A and 6B are used to generate information which is stored in two "working" bit planes (described below) during the boundary definition phase of the system drawing stage. This stored information is then used by the area fill processor during the fill phase to generate the filled area and edges in the display bit planes of pixel memory 30 from which the display is refreshed. As explained below, the boundary definition phase concurrently generates and stores information in the two working bit planes 31 (FIG. 2) as X-axis and Y-axis edges are received by area fill processor 29 from the output of the clipping algorithm. As described below, Z-axis edges are handled subsequent to processing of said X-axis and Y-axis edges. The filling phase of the pixel generation stage commences when the above discussed End Boundary Definition Command is encountered.

At the beginning of the boundary definition phase, the pixels of the two working bit planes are cleared to some known state, e.g., zeros. The first of the two working bit planes, the fill control plane (described below), is used to contain "edge flags" or write signals definitive of the boundary of the clipped area to be filled pursuant to a filling method similar to that described in an article by Ackland and Weste, entitled "The Edge Flag Algorithm—A Fill Method for Raster Scan Displays" and by Adrian Gay in an article entitled "Experience in Practical Implementation of Boundary-Defined Area Fill", both of which are incorporated herein by reference. Alternate known filling algorithms could also be used; however, an edge flag algorithm is believed preferable since it is more readily implemented in hardware. The second of the two working bit planes, the boundary plane (described below), is used to contain actual or "real" edges outputted from the clipping algorithm and any Z-axis edges (preprocessed for removal of extraneous lines as described below). These edges are generated by means of the standard Bresenham line generation algorithm.

A hardware implementation of area fill, consisting of a VLSI gate array and the two dedicated working bit planes, labeled fill control plane (FCP) and boundary plane (BP), is preferably utilized for the drawing of clipped line segment boundary-defined areas. The gate array controls the writing and reading of data to the bit planes for the purpose of drawing line segment boundary-defined area edges, both real and clipped, and for filling the interior of said areas. In particular, area fill hardware performs a two mode operation: (1) boundary plot mode; and (2) scan mode. In the boundary plot mode, the closed boundary of the area is drawn and in the scan mode the interior of the area is filled. Typically, the boundary and the interior of the line segment boundary-defined area have associated with them a boundary color and a different, interior color, respectively. A real (i.e., nonclipped) edge is drawn in the boundary color and a clipped edge is drawn in the interior color during the filling stage.

The contents of the working bit planes are read out and the fill data is sent to screen refresh memory (SRM) during the scan mode. Logically, the bit planes and the screen refresh memory are mapped on a one to one correspondence. The boundary plane contains all real edges of the clipped boundary-defined area and all clipped Z-axis edges. The fill control plane contains one pixel per scan line per vector, with the result that there are pairs of pixels (i.e., edge flags) per horizontal scan line for a given line segment boundary defined area.

In the boundary plot mode of the invention, the area fill operation draws the edges of a clipped boundary-defined area to the bit planes, as well as to the screen refresh memory (SRM), pursuant to the algorithms of the following Tables 1-4. Before proceeding with their description and several examples of clipped extraneous edge deletion, however, certain assumptions must be addressed. Specifically, this discussion assumes horizontal line scanning during the area fill stage. This is worthy of note since the X-axis and Y-axis extraneous edge deletion methods described herein would be reversed if area fill scanning were to proceed vertically rather than horizontally. With the horizontal scan assumption, however, writing to the fill control plane is a function of Y-axis movement.

Also, the following terms shall have the meanings set forth:

Xpos & Ypos—relative movement in the X-axis & Y-axis direction, respectively
"0" denotes no move
"1" denotes move Xsgn & Ysgn—direction of movement in the X-axis & Y-axis direction, respectively.
"0" denotes positive movement
"1" denotes negative movement Wpix—write enable for individual pixels
"0" denotes no write
"1" denotes write.

Further, the tables and examples presented are based on an assumption that four pixels of data are received and/or drawn as a unit, i.e., unless otherwise indicated, and that the clipped polylines of data are examined through their component vector(s). The concepts described though are equally applicable to any number of pixels per vector of data.

Initially, as set forth in Table 1, the type of edge determines whether the bit planes and/or the SRM are capable of being written to.

TABLE 1

| Edge Type | FCP | BP | SRM |
|---|---|---|---|
| Clipped Z (max or min) | Yes | Yes | Yes |
| Real Edge | Yes | Yes | Yes |
| Clipped X (max or min) | Yes | No | No |
| Clipped Ymax | Write first and last pixel of line | No | No |
| Clipped Ymin | No | No | No |

A "yes" indicates that the bit plane or screen refresh memory is allowed to receive a draw or write signal, while a "no" means that it is not. Whether the FCP, BP or SRM is actually written to, however, depends upon the specific fill algorithms yet to be described.

Note that as defined in Table 1, clipped X-axis and clipped Y-axis edges are not written to the boundary plane or the screen refresh memory. This is because such edges are truly vertical and horizontal and are therefore, pursuant to the novel aspects of the invention, implicitly drawn when the clipped boundary-defined area is filled. Further, clipped Ymax and Ymin edges are also handled differently in the FCP since the draw algorithm for the fill control plane does not draw the uppermost pixels of a clipped area but does draw the lowermost pixels. In particular, for a positive Y movement vector the last pixel is not drawn and for a negative Y movement vector the first pixel is not drawn. If desired this write algorithm could be reversed in which case the write commands for the clipped Ymax and clipped Ymin in the FCP of Table 1 would also be reversed.

Drawing to the boundary plane and the screen refresh memory is a function of Wpix as follows:

TABLE 2

| | |
|---|---|
| BP/SRM write for bit(0) | Wpix(0) |
| BP/SRM write for bit(1) | Wpix(1) |
| BP/SRM write for bit(2) | Wpix(2) |
| BP/SRM write for bit(3) | Wpix(3) |

For the present discussion, the Wpix signal for all real edges and clipped Z-axis edges is assumed to comprise a "1" write signal.

As noted, the write signal for the FCP is a function of Y-axis movement and direction, i.e., Ypos & Ysgn. The specific FCP algorithm is set forth in Table 3.

TABLE 3

| | Ysgn=0 | Ysgn=1 |
|---|---|---|
| FCP write for bit(0) | Ypos(0) xor Cin | Cin |
| FCP write for bit(1) | Ypos(1) | Ypos(0) |
| FCP write for bit(2) | Ypos(2) | Ypos(1) |
| FCP write for bit(3) | Ypos(3) | Ypos(2) |

Wherein:
Ypos(0)=relative movement in the Y-axis direction for bit(0)
Ypos(1)=relative movement in the Y-axis direction for bit(1)
Ypos(2)=relative movement in the Y-axis direction for bit(2)
Ypos(3)=relative movement in the Y-axis direction for bit(3)
Cin = a carryin bit.

The carryin bit is a function of the previous vector and operates to indicate a change in direction, i.e., a change in Ysgn from 0 to 1 or from 1 to 0. Although not relevant to the present clipped extraneous edge deletion discussion, for completeness the bit is calculated as follows:

Cin = 0 for the first vector of the clipped boundary-defined area, thereafter:

$$\text{Cin} = \text{Ysgn}^* < (\text{Cin}(i-1)^*\overline{\text{Wpix}(i-1)(0)} + (\text{Ypos}(i-1)(0)^*\overline{\text{Wpix}(i-1)(1)}) + (\text{Ypos}(i-1)(1)^*\overline{\text{Wpix}(i-1)(2)}) + (\text{Ypos}(i-1)(2)^*\overline{\text{Wpix}(i-1)(3)})) + \text{Ypos}(i-1)(3) >$$

Wherein:
i = the present vector
Ysgn(i−1) = Ysgn for the previous vector
Cin(i−1) = the carryin bit for the previous vector
$\overline{\text{Wpix}(i-1)(0)}$ = the inversion of the Wpix for the first pixel of the previous vector
Ypos(i−1)(0) = Ypos for the previous vector at bit(0)

Lastly, before applying a write signal to the appropriate bit plane and/or the screen refresh memory, the boundary plot mode of the invention implements a two cycle read-modify-write operation as follows:
(1) data is read from both bit planes and latched (cycle 1);
(2) data is modified according to Table 4 below; and
(3) new data is written back to both bit planes (cycle 2).

TABLE 4

| Read Data | New Data | Resultant Data to BP | Resultant Data to FCP | Resultant Data to SRM |
|---|---|---|---|---|
| 0 | 0 | 0 | 0 | 0 |

TABLE 4-continued

| Read Data | New Data | Resultant Data to BP | Resultant Data to FCP | Resultant Data to SRM |
|---|---|---|---|---|
| 0 | 1 | 1 | 1 | 1 |
| 1 | 0 | 1 | 1 | 0 |
| 1 | 1 | 1 | 0 | 0 |

As set forth, the boundary plane data is modified by an "OR" operation, which takes data read from the boundary plane (i.e., a previous vector pixel) and logically "ORs" it with the new data (a new vector pixel). The fill control plane has its data modified by an exclusive-OR (XOR) operation, which takes data read from the FCP and logically "XORs" it with the new data. The intent of this operation is to turn off those bits which are "on" when the new data is also "on". Therefore, when drawing vectors, a first vector is written into the fill control plane and when a second vector is drawn to partially overlap the first, whatever segment of the second that overlaps the first will be erased from the FCP. Further, if a third vector is drawn to overlap a segment previously erased, then that segment will be redrawn. The screen refresh memory is updated only when read data from the boundary plane is "0" and new data is "1".

X-axis and Y-axis clipped extraneous edge deletion pursuant to the above area fill algorithms will be better understood with reference to the examples of FIGS. 7A-9B.

X-axis Clipped Extraneous Edge

Figure 7A:
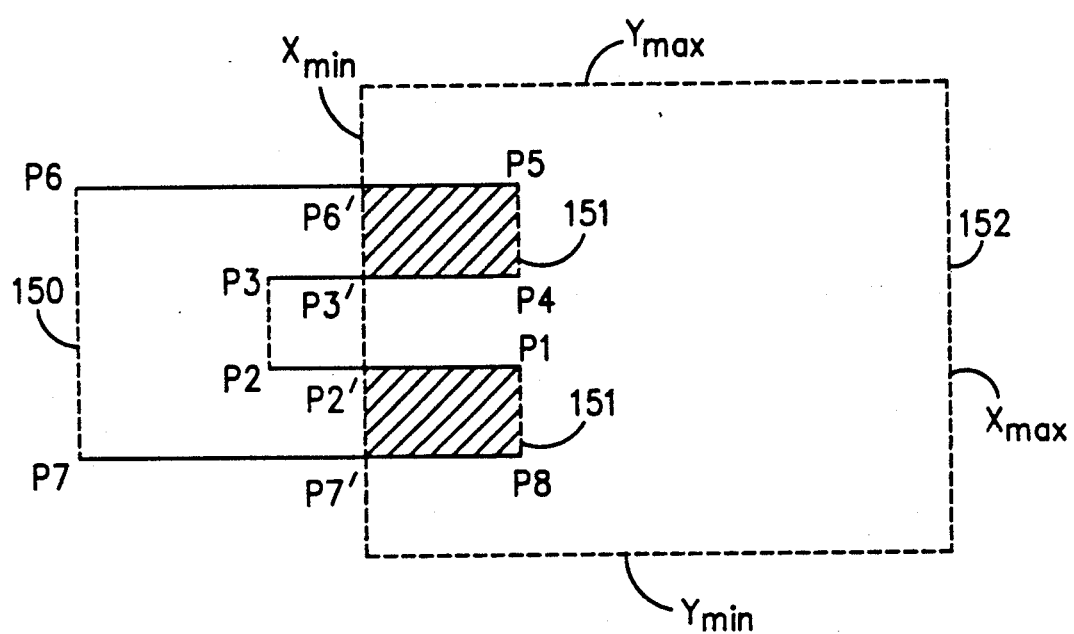

Referring first to FIGS. 7A & 7B, wherein X-axis extraneous edge deletion is depicted. Boundary-defined area 150 is clipped against the Xmin limiting plane of a clipping window 152 such that two discrete areas 151, shown shaded, remain viewable. As discussed above with respect to FIGS. 3A-3C, with such a clipped boundary-defined area, an extraneous edge P2'P3' exists and must be deleted. Dividing the clipped polylines into component vector results in the following information:

P1P2' = real vector
P2'P3' = clipped X-axis vector
P3'P4 = real vector
P4P5 = real vector
P5P6' = real vector
P6'P7' = clipped X-axis vector
P7'P8 = real vector
P8P1 = real vector Assuming for discussion consecutive examination of vectors, the information written to the respective planes and memory appears as shown in FIG. 7B, wherein an "x" represents only movement and a "o" represents data written to the corresponding FCP or BP and SRM (BP/SRM).

P1P2' is a real edge capable of being written to the FCP, BP or SRM (Table 1). Since P1P2' comprises a horizontal movement, the fill control plane does not receive a write signal (Table 3). The BP and SRM are each written to at the pixels corresponding to vector P1P2', i.e., a "1111" signal is received by said plane and memory. (Tables 2 & 4). As noted, the read-modify-write operation of the boundary plane is a logical "OR", meaning that if either the new vector pixel or the read vector pixel is a "1", then the result is a "1" also, while the screen refresh memory is updated whenever the read data from the boundary plane is a "0" and the new data is a "1".

Vector P2'P3' comprises a clipped X-axis edge therefore no data is sent to the BP or SRM (Table 1). Since vector P2'P3' is in the positive Y-axis direction, the write signal is "1110" for bits(0)(1)(2)&(3), respectively (Table 3). This signal is derived from the three positive movements required to pass from bit(0) at P2' to bit(3) at P3', i.e., Ypos(0)(1)(2)&(3) = "1110", respectively. The write signal exists at bit(0) since Ypos(0) is "1" and Cin is "0", determined from the above carryin bit equation.

P3'P4 is a real vector, such that a "1111" write signal is sent to BP/SRM, and is horizontal with no Y-axis movement. Thus, only "x" move signals are sent to the FCP (Tables 1-3).

P4P5 is a real vector, meaning that the BP/SRM each receive a "1111" write signal (Tables 1 & 2), and comprises Y-axis movement with a Ypos of "1110", which results in a write signal of "1110" to the FCP (Table 3), again with Cin = "0".

P5P6' is again a real vector such that a "1111" data signal is written to the BP and SRM. Since there is no Y-axis movement, no data is written to the fill control plane.

P6'P7' is an important vector because mapping of it results in deletion of the extraneous edge between P2'P3' within the fill control plane. P6'P7' comprises an X-axis edge, therefore no information is written to the BP or SRM. Since vector P6'P7' is in the negative Y-axis direction, Ysgn is "1", and reference is made to Table 3 for the write signal. Note that vector 6'7' contains ten pixels of data and, therefore, extrapolating the Table, the write signal for bits (4)-(9) is determined by Ypos (3)-(8), respectively. Again, Cin is "0" and Ypos (0)-(8) are each "1" such that the write signal is "0 111111111". Applying XOR logic (Table 4) to this signal and the corresponding signal read from the FCP for the same pixels, i.e., a "0000111000", results in the deletion of data at bits (5)-(7), thereby eliminating the extraneous edge between P2' & P3'.

P7'P8 and P8P1 are each real vectors which, for the reasons discussed with respect to vectors P1P2' and P4P5, respectively, result in the illustrated data being written to the FCP, BP and SRM.

Lastly, note that all real edges of clipped area 151 exists in the boundary plane and the screen refresh memory and that the appropriate X-axis clipped edges will be produced during area fill from the edge flag or write signals in the fill control plane.

Ymax Extraneous Edge

In FIG. 8A, the line segment boundary-defined area 150' now intersects Ymax of viewing window 152', which produces the following vector types:

P1P2' = real vector
P2'P3' = clipped Ymax vector
P3'P4 = real vector
P4P5 = real vector
P5P6' = real vector
P6'P7' = clipped Ymax vector
P7'P8 = real vector
P8P1 = real vector Again, examining each vector individually and illustrating how the fill control plane, boundary plane and screen refresh memory are written will be explained with reference to related FIG. 8B.

Vector P1P2' is a real edge such that information can be written to the FCP and the BP/SRM (Table 1). Again, assuming Wpix for a real edge is always a write signal, i.e., "1", then a "1111" write signal is sent to the BP and the SRM. Ypos for vector P1P2' is "1110", since Ysgn="0", resulting in a write signal of "1110" (assuming Cin = "0") (Table 3).

Vector P2'P3' comprises a clipped Ymax edge which, referring to Table 1, pre-empts a write signal from being transmitted to the BP or the SRM. Further, the table dictates that only the first and last pixel of the clipped Ymax edge are to be written to in the FCP. Performance of the XOR read-modify-write operation (Table 4) results in the first and last pixels of P2'P3' receiving a write signal.

Vector P3'P4 is a real vector in the negative Y-axis direction meaning that the appropriate pixels in the bit plane and the screen refresh memory receive a "1111" write signal (Table 2) and the fill control plane receives a "0111" signal, which once XORed (Table 4) with the read signal from the corresponding pixels results in the configuration shown. Again, for the four pixel Y movement, Ypos(0)–(3) is equal to "1110" and Cin = "0", derived from the described Cin equation (Table 3).

Vector P4P5 is a real vector such that a "1111" write signal is sent to BP/SRM. Again, note that signals sent to the BP undergo a logical OR operation during the read-modify-write cycle (Table 4). Since there is no Y movement, the fill control plane receives a no write signal for the pixels corresponding to P4P5.

Vector P5P6' is a real vector, resulting in the "1111" write signal to the BP/SRM, and is in the positive Y-axis direction with a Ypos of "1110". Thus, referring to Table 3, the write signal to the FCP is "1110", again with Cin = "0".

Vector P6'P7' is a clipped Ymax edge such that only move signals are sent to the BP/SRM and only the first and last pixel of the vector in the FCP receive a "write signal" (Table 1). Note that the read-modify-write cycle is still in operation (Table 4), but that the previously lit pixels at P2' & P3' are XORed with a no write signal meaning that they remain "on".

Vector P7'P8' is a real vector such that a "1111" write signal is sent to the BP/SRM and is in the negative Y-axis direction with a Ypos(0)–(3) equal to "1110". For a Ysgn of "1", and again calculating Cin = "0", a write signal of "0111" is sent to the FCP (Table 3).

Vector P8P1 is a real vector with a write signal to the BP/SRM of "1111" and is in the X-axis direction such that no information is written to the fill control plane.

Again, note that all real edges exist within BP/SRM and that the correct Ymax clipped edges will be produced during area fill scanning from the write signals in the FCP.

Ymin Extraneous Edge

Figures 9A, 9B:
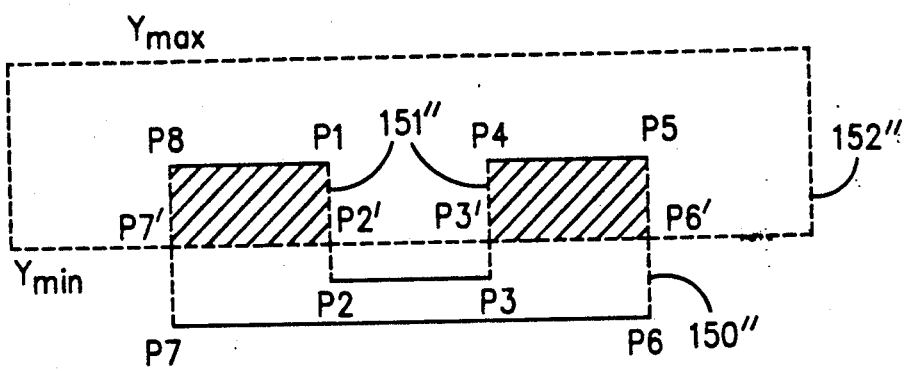
FIGS. 9A and 9B graphically illustrate Ymin clipped extraneous edge deletion pursuant to the present invention.

Boundary-defined area 150'' is clipped against Ymin of viewing window 152'' in FIG. 9A. Area 150'' is identical to previously discussed areas 150 & 150' such that once clipped against a limiting plane an extraneous edge P2'P3' is produced. The desired result 151'' comprises the two distinct areas shown with shading. Again, vectors definitive of area 150'' will be examined sequentially. Beginning at point P1 the following vectors are to be drawn:

P1P2' = real vector
P2'P3' = clipped Ymin vector
P3'P4' = real vector
P4P5 = real vector
P5P6' = real vector
P6'P7' = clipped Ymin vector
P7'P8 = real vector
P8P1 = real vector Initially, note with reference to Table 1 that no write signal is sent to either plane or the screen refresh memory when the clipped edge comprises a Ymin vector. As explained above, the clipped Ymin edge is inherently completed as a result of the outlined fill algorithms.

Vector P1P2' is real such that a "1111" write signal is sent to the BP/SRM and is in the negative Y-axis direction such that the write signal to the FCP is "0111" (with Cin = "0") (Table 3).

P2'P3' comprises a clipped Ymin edge meaning that neither the FCP nor the BP/SRM are to receive a write signal (Table 1).

Vector P3'P4 is a real edge, such that a "1111" write signal is sent to the BP/SRM, and is in the positive Y-axis direction resulting in a "1110" write signal to the FCP.

Vector P4P5 is a real horizontal edge such that only a move signal is sent to the FCP, while the BP/SRM receives a write signal of "1111".

Vector P5P6' is again a real edge meaning that the BP/SRM receives a "1111" write signal, and is in the negative Y-axis direction such that the FCP receives a "0111" signal (Table 3).

Vector P6'P7' is a Ymin clipped edge and no write signals are sent to the FCP or the BP/SRM (Table 1).

Vector P7'P8 is a real edge in the positive Y-axis direction such that the fill control plane receives a "1110" signal and the BP/SRM receives a "1111" signal.

Lastly, vector P8P1 is a horizontal real edge meaning that no write signal is sent to the FCP and a "1111" signal is sent to the BP/SRM.

As noted above, the second mode, i.e., the scan mode, does the actual fill of the line segment boundary-defined area. Data from the boundary plane and the fill control plane is read out horizontally starting at the lower left corner of the area to the lower right corner. Data is then incremented one scan line and read from the right side to the left side. The process is repeated until all data is scanned out of the bit planes, i.e., until the top of the boundary-defined area is reached.

In the fill control plane each pair of bits on a horizontal line controls the enabling/disabling of the fill operation. The fill operation start with the first bit and continues through the second bit. It is in this way that clipped X-axis and clipped Y-axis edges are drawn since they were not written into the boundary plane or the screen refresh memory. When the fill is enabled it is checked against boundary plane data. If the corresponding boundary plane bits are "on" (representative of a real or clipped Z-axis edge), then those bits are not written as part of the fill.

As noted briefly above, the removal of extraneous edges is somewhat more complicated with three dimensional clipping, and in particular, where a line segment boundary-defined area is clipped against a Z-axis plane (i.e, Zmin or Zmax). A clipped Z edge may exist in any degree of rotation on the graphics display monitor. Applicant's exclusive-OR method of removing edges that lie in odd multiples depends on the premise that overlying edges will be a complete set of each other, i.e., occupy the same pixels. This is always true for X-axis and Y-axis clipped edges since, referring to FIG. 3A, an X-axis clipped edge is always a horizontal line segment and a Y-axis clipped edge is always a vertical line segment. When pixels are generated for such clipped edges, there is no fractional Y or X increment involved with the X-axis edge or Y-axis edge, respectively. The horizontal line segment has a Y increment of zero and the vertical line segment has an X increment of zero. Thus, any points generated on either the X-axis or the Y-axis are guaranteed to overlie one another, assuming clipped edge segments overlap.

Z-axis clipped edges are not guaranteed to totally eclipse segments of each other that overlie in even multiples due to logic utilized by the graphics system when generating the end points of a clipped Z-axis edge. An example of clipping a line segment boundary-defined area 160 against a Z-axis limiting plane 162, slightly rotated from horizontal, is shown in FIG. 10A. Area 160 is defined by a polyline P1P2P3P4P5P6P7P8P1. Clipping area 160 against Z-axis plane 162 produces new clipped edges P3'P4' and P7'P8'. These edges have a segment P3'P4' that should overlay and thus be deleted. However, since P3' and P4' are not on an integer screen coordinate they are rounded to the nearest integer point. FIG. 10B illustrates the error introduced by this integer rounding when the points are connected by straight lines. The results of rasterization of clipped edges P3'P4' and P7'P8' are shown in FIG. 10C. As depicted, an exclusive-OR operation performed on the clipped edges is incomplete in that certain points of the extraneous edge P3'P4' remain. The area fill edge flag algorithm requires that these edges be completely eliminated or else indeterminate results occur. Z-axis extraneous edges must, therefore, be separately processed subsequent clipping but before the area fill stage to remove any unwanted line segments. This is accomplished as described below.

Z-axis clipped line segments are initially stored in two heaps, depending upon whether the edge is clipped in the front Z plane or back Z plane, i.e., Zmin or Zmax, respectively. After the line segment boundary-defined area has completely passed through the clipping stage, clipped Z-axis line segments are sorted in their respective heaps as a series of points. The sorting algorithm used is not critical. Typically, boundary-defined areas will have a low number of Z-axis clipped edges (e.g., less than three). For this reason, a simple insertion sort technique can be used. Although not the most efficient for sorting large numbers of vector points, the low overhead in the insertion algorithm maximizes efficiency in most cases.

The order of sort is determined by the axis of major change. Edges that reside within octants 1, 4, 5, & 8 are sorted based upon the value of the X-axis coordinates of the points, and edges that occupy octants 2, 3, 6, & 7 are sorted based upon the Y-axis coordinates. The sorted points are then grouped in pairs to form new clipped line segments which do not overlie one another. In the example shown in FIG. 10B, after sorting, vectors P8'P3' and P4'P7' would be produced, thereby eliminating the extraneous edge P3'P4'. The new clipped line segments are sent to the vector generator for area fill processing as outlined above subsequent processing of all real edges, and clipped X-axis and clipped Y-axis edges. This allows the Z-axis write signals to the BP to be written in the interior color rather than the boundary color.

Two examples will serve to better illustrate operation of the boundary-defined area clipping and extraneous edge deletion methods of this invention.

Example 1

Figure 11A:
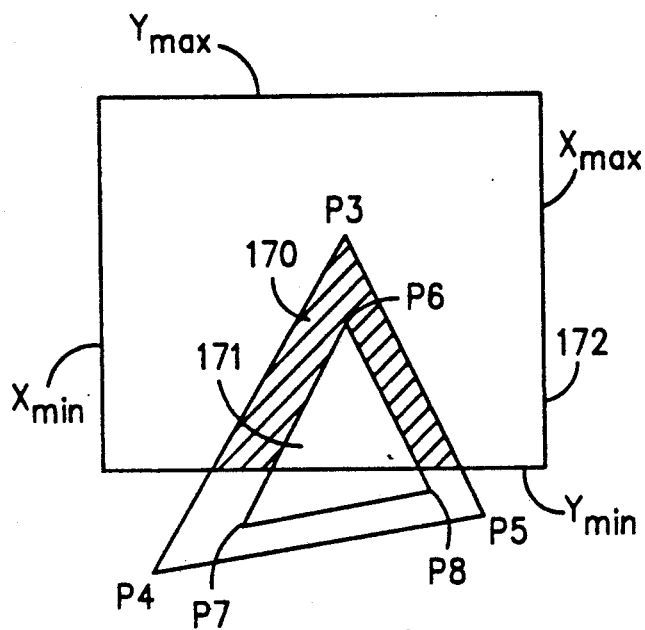
FIGS. 11A, 11B; and 11C graphically illustrate an example of single plane, line, segment boundary-defined area clipping pursuant to the present invention.

Referring first to FIG. 11A, a line segment boundary-defined area 170 is shown lying partially within a viewport 172 defined by four clipping planes Xmin, Xmax, Ymin, Ymax. As illustrated, primitive 170 only intersects the Xmin clipping plane. Complicating the clipping operation, however, is the presence of a hole 171 within area 170. An input data stream is user defined as follows:

Polyline P3P4P5P3
Polyline P6P7P8P6

Applying the algorithm of FIGS. 6A and 6B, receipt of a Begin Polyline Command initiates processing of the input data. A polyline command is first written to the output at instruction 92 to indicate start of a clipped polyline. The 1st__Flag register is set "on" and return is made to top of the algorithm where the next piece of data is read into present point register P2. Register P2 now contains the first point of the first input polyline, i.e., P3, and since vertex P3 is within viewport 172, it is written to the output at instruction 102. Present point P2, is then written into previous point register P1 and the next vertex P4 is read into present point register P2. Since line segment P1P2, i.e., P3P4 in the example, intersects the clipping plane (assuming the plane is presently defined as Xmin), an intersection point I or P4', is computed at instruction 108. Intersection point P4' is subsequently written to the output at instruction 118 since this is the first of two intersection points to be paired and present point P2 is on the invisible side of clipping plane Ymin. Intersection point P4' is also stored in register CP1 and the clipped status flag is set "on". Present point P2 is copied to the previous point register P1 at instruction 124 and the next vertex P5 is received at present point register P2. Line segment P4P5 is on the invisible side of clipping plane Xmin and thus no output is provided. Present point P2, i.e., P5 in the example, is written to previous point register P1 at instruction 104 and the next vertex, P3, of the polyline is received at the present point register P2. Line segment P5P3 intersects clipping plane Xmin at point P5', computed at instruction 108 of the algorithm, and therefore the processor is directed to determine whether the clipped status flag is set. Since point P5' is the second of two points to be paired, P4' being already stored, and since present point P2 is on the visible side of the clipping plane, the processor initially writes at instruction 128 a Begin Polyline Command to the output, followed by clip point P4' stored in the CP1 register, present clip point P5', and present point P3 held in register P2. After outputting paired intersection points, i.e., P4' and P5', the clipped status flag is set to "off" and return is made to the top of the algorithm. The resulting clipped output data stream from input of the first polyline is as follows:

Polyline P3P4'
Polyline P4'P5'P3

Polyline P6P7P8P6 defining hole 171 is next processed in a similar manner, resulting in an output data stream of:

Polyline P6P7'
Polyline P7'P8'P6

Figure 11B:
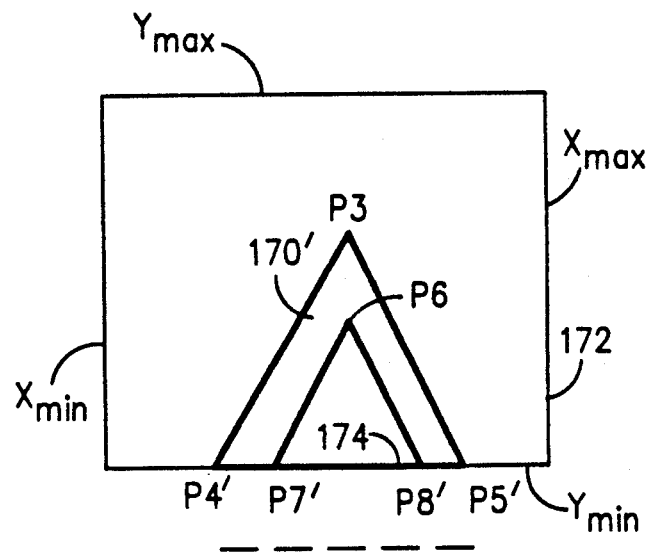
Figure 11C:
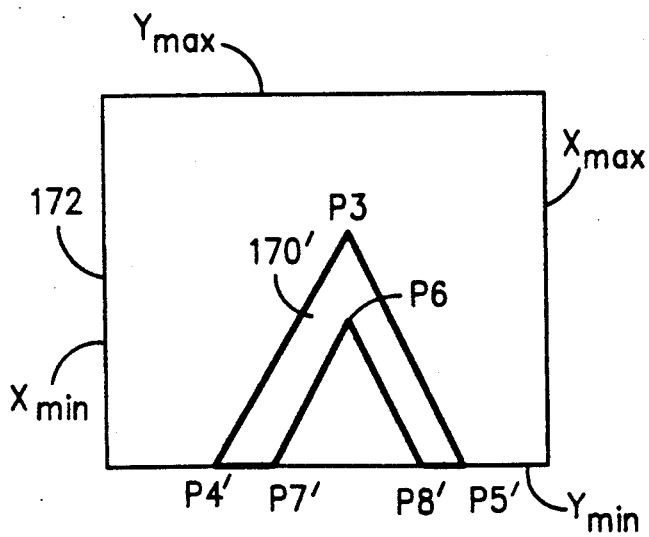

Drawing the outputted polylines produces the clipped boundary-defined area illustrated in FIG. 11B. As shown, an extraneous edge 174 at the boundary of viewport 172 is produced once connecting line segments of outputted polylines are generated. The described extraneous edge deletion method of this invention is utilized to delete line segment 174, between clipped points P7' and P8', as the connecting lines of the polylines are drawn. Specifically, since line 174 is a clipped X-axis edge, application of the exclusive-OR operation in the boundary definition phase of area fill to vectors P4'P5' and P7'P8' results in the deletion of edge 174 in the FCP contemporaneous with drawing of output polyline P7'P8'P6.

EXAMPLE 2

Figure 12A:
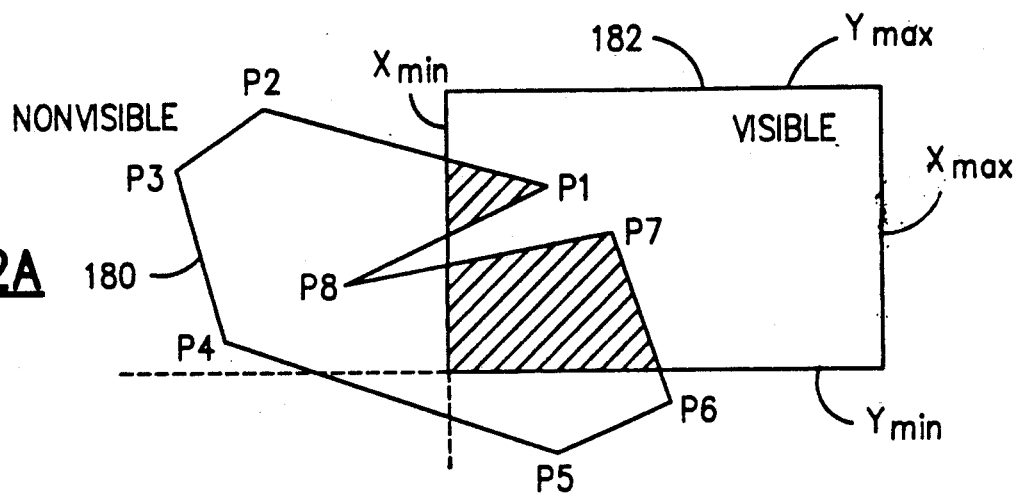
FIGS. 12A, 12B, 12C and 12D graphically illustrate an example of double plane line segment boundary-defined area clipping pursuant to the present invention.

Clipping of a boundary-defined area against two limiting planes will be described with reference to FIGS. 12A–12D. As shown in FIG. 12A, boundary-defined area 180 has two portions which reside within the visible side of a viewport 182. Again, viewport 182 is defined by four limiting planes Xmin, Xmax, Ymin, Ymax. Area 180 is shown to intersect both Xmin and Ymin. The user defined input data stream is provided as follows:

Polyline P1P2
Polyline P3P4P5P6
Polyline P7P8P1
Polyline P7P6
Polyline P3P2

Figure 12B:
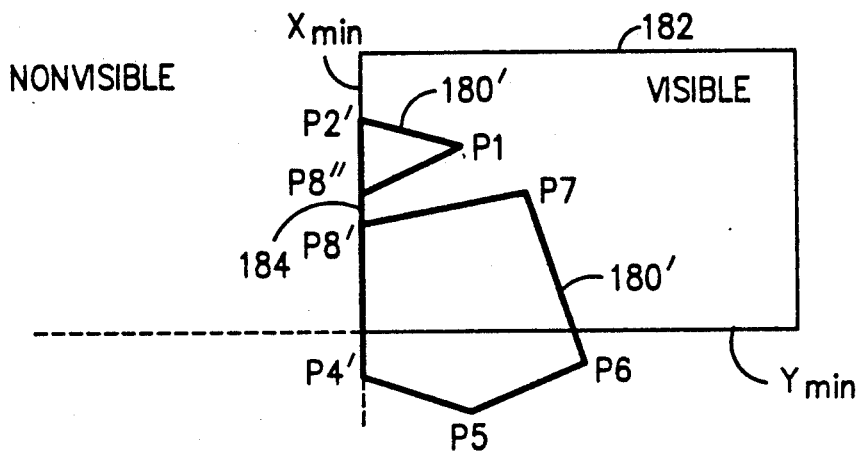
Figure 12C:
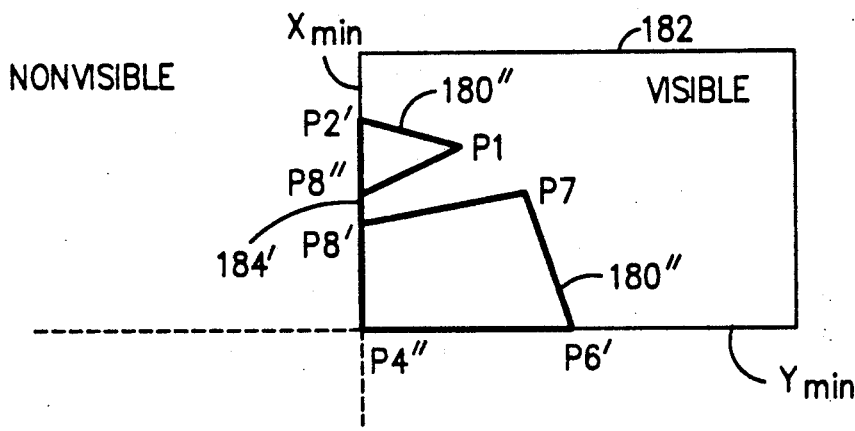
Figure 12D:
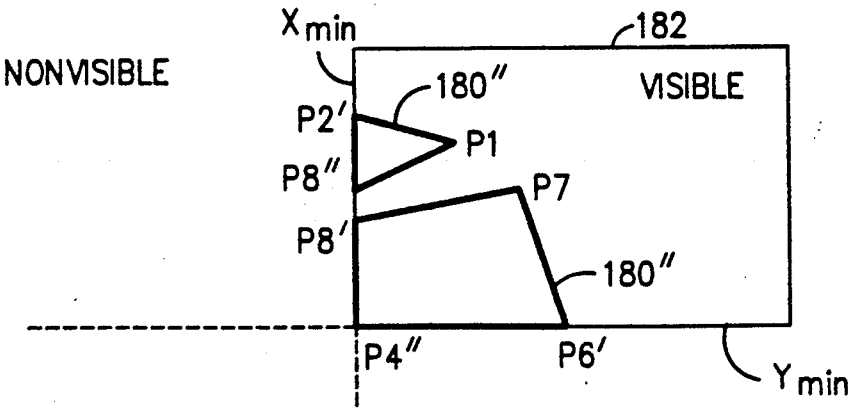

Initially, assume the limiting plane is defined in a main clipping routine to be Xmin. When the plane is so defined and the input data is passed through the clipping algorithm of FIGS. 6A and 6B, a clipped boundary-defined area as shown in FIG. 12B is obtained. Briefly explained, line segment P1P2 intersects Xmin, resulting in a first clipped point P2' being computed, outputted and stored in register CP1. Thus, the first outputted polyline comprises P1P2'. A second clip point is obtained when line segment P4P5 of the second input polyline intersects an extrapolation of Xmin. Clipped points P2' and P4' are paired and outputted under a Begin Polyline Command with point P5, which as shown, is on the visible side of Xmin. P6 is added to the outputted polyline upon the next pass through the algorithm. The following input polyline received at the top of the algorithm, P7P8P1, intersects the limiting plane twice at P8' and P8". Initially, clipped polyline P7P8' is outputted and since P8' is the first of two clip points to be paired, it is stored in register CP1. With another pass through the algorithm, a second clip point P8" is obtained and paired with previous clipped point P8'. At this point, since the present vertex stored in register P2, i.e., P1 in the example, is on the visible side of the plane, a Begin Polyline Command is written to the output, followed by vertices P8', P8" and P1. The last polyline outputted definitive of clipped boundary-defined area 180' is obtained when polyline P7P6 is processed, since both vertices are on the visible side of the limiting plane.

To summarize, information outputted from the clipping algorithm as representative of the single plane clipped boundary-defined area 180' is as follows:

Polyline P1P2'
Polyline P2'P4'P5P6
Polyline P7P8'
Polyline P8'P8"P1
Polyline P7P6

X-axis extraneous edge 184 between intersection points P8" and P8' is automatically erased from the FCP during the boundary definition phase of the pixel generation stage of system 10 utilizing the above described exclusive-OR function (Table 4) since line segments drawn between vertices P2' and P4', and between P8" and P8' overlie from P8" to P8'.

Continuing with the clipping operation, return is made to the main clipping routine whereat the limiting plane is redefined as Ymin, and the clipping algorithm of FIGS. 6A and 6B is called to now process the single plane clipped boundary-defined area 180'. Initially polyline P1P2' passes through the clipping operation unchanged. Line segment P2'P4' intersects limiting plane Ymin at P4", which is identified as the first of two intersection points to be paired and therefore stored in register CP1. Vertices P4', P5 and P6 are deleted because they are on the invisible side of limiting plane Ymin. The next input polyline P7P8' remains unchanged, as does the subsequent one P8'P8"P1. The second intersection point is computed when polyline P7P6 intersects plane Ymin at point P6'. Since the present point P2 under evaluation at this time, i.e., vertex P6, is on the invisible side of the plane, clipped point P6' is written to the output. This is followed by a Begin Polyline Command, previous clip point P4" stored in register CP1, and present intersection point P6'. The resulting double plane clipped boundary-defined area 180" is thus defined by the following:

Polyline P1P2'
Polyline P2'P4"
Polyline P7P8'
Polyline P8'P8"P1
Polyline P7P6'
Polyline P4"P6'

Again, Xmin extraneous edge 184' between intersection points P8" and P8' is removed from the FCP during the boundary definition phase of the pixel generation stage as discussed above. Namely, since generation of a line segment between vertices P2' and P4" also connects vertices P8" and P8', upon generation of connecting line segments for polyline P8'P8"P1, the exclusive-OR function of the definition phase erases line 184' as being drawn twice.

It will be observed from the above that this invention fully meets the objectives set forth herein. A line segment boundary-defined area clipping method is described capable of handling continuous or discontinuous polylines of data corresponding to a boundary-defined area to be clipped. In addition, such a clipping method is provided requiring less hardware than heretofore known clipping methods capable of handling discontinuously presented data. Further, an extraneous edge deletion method is provided which erases unwanted line segments without adverse affects on system performance.

Although one embodiment of the clipping and extraneous edge removal methods of this invention have been illustrated in the accompanying drawings and described in the foregoing detailed description, it will be understood that the invention is not limited to the particular embodiments described herein but is capable of numerous rearrangments, modifications and substitutions without departing from the scope of the invention. For example, rather than pipeline implementation, the clipping algorithm described herein may be utilized in a nonreentrant polygon clipping method. Further, the clipping algorithm may be used with a different extraneous edge deletion method, and similarly, the extraneous edge deletion method may be used with a different boundary-defined area clipping algorithm, although the combination described herein is believed to have a beneficial synergistic effect on graphics system performance. Other changes will suggest themselves to those skilled in the art. The following claims are intended to encompass all such modifications.

We claim:

1. A method for clipping a line segment boundary-defined area represented in two or three dimensions against a limiting plane, intersecting the X, Y, or Z axis, that defines visible and not visible regions and for eliminating any clipped extraneous edge resulting therefrom, said method allowing a random or ordered set of polylines definitive of said boundary-defined area to be processed through clipping and area filling processes of a computer graphics display system in which graphics figures are defined by boundary-defined areas and appear on an orthogonal X-axis Y-axis display, said method comprising the steps of:
   (a) repeating the following steps for each line segment of said boundary-defined area:
      (1) testing said line segment to determine whether said line segment intersects said limiting plane;
      (2) if said line segment does not intersect, generating a clipped output segment corresponding to said line segment if said line segment lies in said visible region;
      (3) if said line segment intersects said limiting plane:
         (i) determining a point at which said line segment of said boundary-defined area intersects said plane;
         (ii) generating a clipped output segment representing the visible portion of said line segment;
         (iii) if a prior intersection point exists, generating a clipped output segment between said determined intersecting point and said prior intersecting point, thereby pairing said intersection points;
         (iv) if no prior intersecting point exists, saving said determined intersecting point as a prior intersecting point; and
   (b) processing said clipped output segments to eliminate any extraneous edge formed when lines are drawn between the points comprising each of said clipped output segments, wherein said processing includes eliminating any extraneous edge as clipped boundary-defined area edges are drawn during a boundary definition phase of the area fill processing when said plane comprises an X-axis plane or a Y-axis plane, and wherein said area fill processing includes utilizing two working bit planes to define clipped boundary-defined area edges and to process said intersection point pairs, said working bit planes comprising a fill control plane and a boundary plane.

2. The boundary-defined area clipping and deletion method of claim 1, further comprising the step of:
   (c) repeating steps (a)-(b) for each of a plurality of limiting planes definitive of a viewing window.

3. The boundary-defined area clipping and deletion method of claim 1 or 2, wherein said area fill processing includes utilizing the fill control plane to define any X-axis clipped edge or Y-axis clipped edge and the boundary plane to define a real edge of the clipped boundary-defined area, said area fill processing deleting any clipped X-axis or clipped Y-axis extraneous edge simultaneously with the defining of said clipped X-axis, clipped Y-axis and real edges.

4. The boundary-defined area clipping and deletion method of claim 3, wherein for each real edge and clipped edge definitive of a clipped boundary-defined area, writing to fill control plane during area fill processing is dependent upon Y-axis movement.

5. The boundary-defined area clipping and deletion method of claim 4, wherein the area fill processing includes controlling writing of each real edge and clipped edge definitive of a clipped boundary-defined area to the fill control plane and the boundary plane pursuant to the following table:

| Edge Type | Fill Control Plane | Boundary Plane |
| --- | --- | --- |
| Clipped Z (max or min) | Yes | Yes |
| Real Edge | Yes | Yes |
| Clipped X (max or min) | Yes | No |
| Clipped Ymax | Write first and last pixel of line | No |
| Clipped Ymin | No | No | wherein "yes" authorizes writing to the respective plane and "no" inhibits writing to the respective plane, and any clipped Ymax edge only has a corresponding first pixel and last pixel written to the fill control plane.

6. The boundary-defined area clipping and deletion method of claim 5, wherein area fill processing includes writing any clipped X-axis edge, clipped Z-axis edge and real edge to the fill control plane pursuant to a write then move algorithm if said edge is in the positive Y-axis direction and pursuant to a move then write algorithm if said edge is in the negative y-axis direction.

7. The boundary-defined area clipping and deletion method of claim 6, wherein area fill processing includes writing any clipped X-axis edge, clipped Z-axis edge and real edge to the fill control plane pursuant to the following table:

| Fill Control Plane | Ysgn=0 | Ysgn=1 |
| --- | --- | --- |
| Write for bit(0) | Ypos(0) xor Cin | Cin |
| Write for bit(1) | Ypos(1) | Ypos(0) |
| Write for bit(2) | Ypos(2) | Ypos(1) |
| Write for bit(3) | Ypos(3) | Ypos(2) |
| . | . | . |
| Write for bit(n-1) | Ypos(n-1) | Ypos(n-1) |

Wherein:
Ysgn = orientation of movement in the Y-axis direction
   "0"—denotes positive movement
   "1"—denotes negative movement
Ypos(0) = relative movement in the Y-axis direction for bit(0)
Ypos(1) = relative movement in the Y-axis direction for bit(1)
Ypos(2) = relative movement in the Y-axis direction for bit(2)
Ypos(3) = relative movement in the Y-axis direction for bit(3)
Ypos(n−2) = relative movement in the Y-axis direction for bit(n−2)
Ypos(n−1) = relative movement in the Y-axis direction for bit(n−1)
Cin = a carrying bit calculated as follows:
Cin = 0 for the first edge of the clipped boundary-defined area, thereafter:

$$Cin = Ysgn * < (\overline{Cin(i-1) * Wpix(i-1)(0)}) + (Ypos(i-1)(0) * Wpix(i-1)(1)) + (Ypos-$$

$(i-1)(1)*\overline{Wpix(i-1)(2)}) + (Ypos(i-1)(n-2)*\overline{Wpix(i-1)(n-1)})) + Ypos(i-1)(n-1)>$ Wherein:

i = present edge n = number of pixels definitive of the previous edge

Ysgn(i−1) = Ysgn for the previous edge

Cin(i−1) = the carrying bit for the previous edge $\overline{Wpix(i-1)(0)}$ = the inversion of the Wpix for the first pixel of the previous edge $\overline{Wpix(i-1)(1)}$ = the inversion of the Wpix for the second pixel of the previous edge $\overline{Wpix(i-1)(2)}$ = the inversion of the Wpix for the third pixel of the previous edge $\overline{Wpix(i-1)(n-1)}$ = the inversion of the Wpix for the last pixel of the previous edge Ypos(i−1)(0) = Ypos for the previous edge at bit(0)

Ypos(i−1)(1) = Ypos for the previous edge at bit(1)

Ypos(i−1)(n−2) = Ypos for the previous edge at bit(n−2)

Ypos(i−1)(n−1) = Ypos for the previous edge at bit(n−1)

8. The boundary-defined are clipping and deletion method of claim 6, wherein said area fill processing includes utilizing a read-modify-write operation before writing new data representative of a clipped boundary-defined area edge to the fill control plane, said operation including the steps of:

reading preexisting pixel data from the corresponding location in the fill control plane and latching said data;

applying an exclusive-or operation to the read data and the new data; and writing back to the fill control plane the data resulting from said exclusive-or operation.

9. The boundary-defined are clipping and deletion method of claim 1, wherein said step(a)(3) includes:

setting a flag after a first intersection point is determined;

checking the status of said flag after a second intersection point is determined; and resetting the flag after pairing the first and second intersection points.

10. The boundary-defined are clipping and deletion of claim 1, wherein when said plane comprises an X-axis plane, said processing step (b) includes drawing lines between the points comprising each of said intersection point pairs and simultaneously removing clipped edges formed wherever particular sections of said lines overlie in even multiples.

11. The boundary-defined are clipping and deletion method of claim 10, wherein when said plane comprises an X-axis plane, said simultaneous extraneous edge removal step (b) includes:

utilizing exclusive-or logic to erase line sections drawn a second time.

12. The boundary-defined area clipping and deletion method of claim 1, wherein when the clipping plane comprises a Z-axis plane, said method further comprises a sorting step prior to said processing step (b) for sorting said point pairs before the area fill process of the graphics display system to eliminate any extraneous edge.

13. A method for clipping a line segment boundary-defined area against a limiting plane and for eliminating any clipped extraneous edge resulting therefrom, said method allowing a random or ordered set of polylines definitive of said boundary-defined area to be processed through clipping and area filling processes of a computer graphics display system in which graphics figures are defined by boundary-defined areas and appear on an orthogonal X-axis Y-axis display, said method comprising the steps of:

(a) determining the point at which a first line segment of a first boundary-defined are intersects a clipping plane;

(b) storing data corresponding to said first intersection point;

(c) setting a flag to indicate determination of said first intersection point;

(d) determining the point at which a second line segment intersects the clipping plane;

(e) checking the status of said flag and if the flag is set, pairing said determined first and second intersection points;

(f) resetting said flag;

(g) repeating steps (a)-(f) until all line segments of the boundary-defined area are evaluated for intersection with the clipping plane; and (h) where a plurality of intersection point pairs are determined, processing said point pairs by drawing lines between the points comprising each of said intersection point pairs and simultaneously removing clipped extraneous edges formed wherever particular sections of said lines overlie in odd multiples.

14. The boundary-defined area clipping and deletion method of claim 13, further comprising the step of:

(i) repeating steps (a)-(h) for each of a plurality of window defining clipping planes.

15. The boundary-defined area clipping method and deletion method of claim 14, further comprising the step of:

(j) repeating steps (a)-(i) for each of a plurality of boundary-defined areas definitive of a graphics figure.

16. The boundary-defined area clipping and deletion method of claim 13, wherein when said plane comprises an X-axis plane, said processing step (h) includes applying exclusive-or logic to erase said drawn line sections which overlie in even multiples.

17. The boundary-defined area clipping and deletion method of claim 13, further comprising a sorting step prior to said processing step (h) for sorting said point pairs before the area filling process of the computer graphics display system to eliminate any extraneous edge when the clipping plane comprises a Z-axis plane.

18. A method for deleting an extraneous edge formed as a result of a line segment boundary-defined area being clipped against a limiting plane in a computer graphics display system in which graphics figures are defined by line segment boundary-defined areas and appear on a display composed of pixels having storage locations corresponding thereto, said extraneous edge deletion method comprising the steps of:

(a) generating pixels representing an edge of a clipped line segment boundary-defined area during area fill processing of the graphics display system;

(b) for each generated pixel:

(1) reading the storage location corresponding to the generated pixel to determine whether a pixel is stored at said location;

(2) if no pixel is stored at said location, storing the generated pixel at said location;

(3) if a pixel is stored at said location, erasing the stored pixel at said location, thereby removing any clipped extraneous edge as said pixel is generated.

19. A method as in claim 18 in which said display is an orthogonal X-axis Y-axis display, said area being clipped against an X- or Y-axis limiting plane to form an X- or Y-axis edge, said generated pixels representing said X- or Y-axis edge.

* * * * *